(12) United States Patent
Nielsen et al.

(10) Patent No.: US 10,785,532 B2
(45) Date of Patent: *Sep. 22, 2020

(54) METHODS AND APPARATUS TO IDENTIFY AND CREDIT MEDIA USING RATIOS OF MEDIA CHARACTERISTICS

(71) Applicant: The Nielsen Company (US), LLC, New York, NY (US)

(72) Inventors: Christen V. Nielsen, Dunedin, FL (US); David H. Wright, Safety Harbor, FL (US); Charles C. Conklin, New Port Richey, FL (US); Daniel Nelson, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,056

(22) Filed: Jul. 15, 2019

(65) Prior Publication Data

US 2019/0342610 A1 Nov. 7, 2019

Related U.S. Application Data

(63) Continuation of application No. 16/055,829, filed on Aug. 6, 2018, now Pat. No. 10,368,127, which is a
(Continued)

(51) Int. Cl.
*H04N 21/442* (2011.01)
*H04N 21/439* (2011.01)
(Continued)

(52) U.S. Cl.
CPC ...... *H04N 21/44204* (2013.01); *H04H 60/31* (2013.01); *H04H 60/56* (2013.01);
(Continued)

(58) Field of Classification Search
CPC ......... H04N 21/44204; H04N 21/8456; H04N 21/254; H04N 21/2662; H04N 21/4394;
(Continued)

(56) References Cited

U.S. PATENT DOCUMENTS 5,276,629 A 1/1994 Reynolds
7,415,129 B2 8/2008 Rhoads
(Continued)

OTHER PUBLICATIONS

Charles C. Conklin, "Biologically-Inspired Vision Algorithms", Thesis submitted to the Florida State University FAMU-FSU College of Engineering, Jul. 29, 1999, 82 pages.
(Continued)

*Primary Examiner* — Nasser M Goodarzi
*Assistant Examiner* — Adil Ocak
(74) *Attorney, Agent, or Firm* — Hanley, Flight & Zimmerman, LLC

(57) ABSTRACT

Apparatus, systems, articles of manufacture, and methods to identify and credit media using ratios of media characteristics are disclosed herein. An example apparatus to identify media includes a memory including computer readable instructions and a processor to execute the instructions to at least determine a first ratio based on a first time interval and a second time interval of a plurality of time intervals of a monitored media signature, determine a second ratio based on a third time interval and a fourth time interval of the plurality of time intervals of the monitored media signature, generate a monitored media ratio signature based on the first and second ratios, and compare the monitored media ratio signature with a reference ratio signature to identify the media.

20 Claims, 11 Drawing Sheets

Related U.S. Application Data continuation of application No. 15/234,904, filed on Aug. 11, 2016, now Pat. No. 10,045,075.

(60) Provisional application No. 62/296,940, filed on Feb. 18, 2016.

(51) Int. Cl.

| | | |
|---|---|---|
| *H04N 21/44* | (2011.01) | |
| *H04N 21/84* | (2011.01) | |
| *H04N 21/254* | (2011.01) | |
| *H04N 21/845* | (2011.01) | |
| *H04N 21/2662* | (2011.01) | |
| *H04H 60/31* | (2008.01) | |
| *H04H 60/56* | (2008.01) | |
| *H04N 21/8358* | (2011.01) | |

(52) U.S. Cl.
CPC ....... *H04N 21/254* (2013.01); *H04N 21/2662* (2013.01); *H04N 21/4394* (2013.01); *H04N 21/44008* (2013.01); *H04N 21/8358* (2013.01); *H04N 21/84* (2013.01); *H04N 21/8456* (2013.01); *H04H 2201/90* (2013.01)

(58) Field of Classification Search
CPC ......... H04N 21/44008; H04N 21/8358; H04N 21/84; H04H 60/31; H04H 60/56
See application file for complete search history.

(56) References Cited

U.S. PATENT DOCUMENTS

| | | | |
|---|---|---|---|
| 7,650,616 B2 * | 1/2010 | Lee | ............... G06K 9/00523 |
| | | | 725/17 |
| 7,870,574 B2 | 1/2011 | Kenyon et al. | |
| 8,108,887 B2 | 1/2012 | Lee | |
| 8,335,786 B2 | 12/2012 | Pereira et al. | |
| 8,953,811 B1 | 2/2015 | Sharifi et al. | |
| 9,307,337 B2 | 4/2016 | Fonseca, Jr. et al. | |
| 10,045,075 B2 | 8/2018 | Nielsen et al. | |
| 10,368,127 B2 | 7/2019 | Nielsen et al. | |
| 2011/0052136 A1 | 3/2011 | Homan et al. | |
| 2011/0088053 A1 * | 4/2011 | Lee | ................. H04H 60/59 |
| | | | 725/19 |
| 2013/0160042 A1 | 6/2013 | Stokes et al. | |
| 2017/0245009 A1 | 8/2017 | Nielsen et al. | |

OTHER PUBLICATIONS

United States Patent and Trademark Office, "Corrected Notice of Allowance," issued in connection with U.S. Appl. No. 15/234,904, dated Apr. 2, 2018, 4 pages.

United States Patent and Trademark Office, "Notice of Allowance," issued in connection with U.S. Appl. No. 15/234,904, dated Jan. 18, 2018, 19 pages.

United States Patent and Trademark Office, "Non-Final Office action," issued in connection with U.S. Appl. No. 15/234,904, dated Jun. 13, 2017, 32 pages.

United States Patent and Trademark Office, "Notice of Allowance," issued in connection with U.S. Appl. No. 16/055,829, dated Mar. 13, 2019, 8 pages.

* cited by examiner

| Monitored Deltas $M_{TC} = ?$ | $dT_m(1)$ | $dT_m(2)$ | $dT_m(3)$ | $dT_m(4)$ | $dT_m(5)$ | $dT_m(6)$ | $dT_m(7)$ | $dT_m(8)$ | |
|---|---|---|---|---|---|---|---|---|---|
| | 0.3083 | 0.3927 | 0.4874 | 0.4286 | 0.1426 | 0.3571 | 0.5000 | 0.2143 | --- |

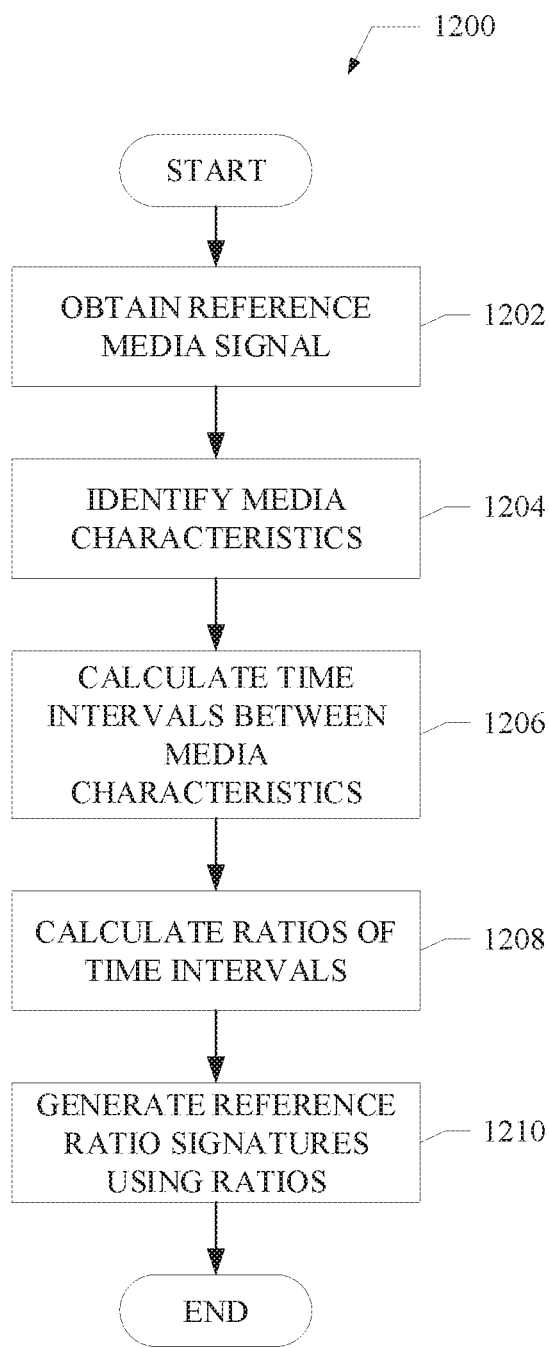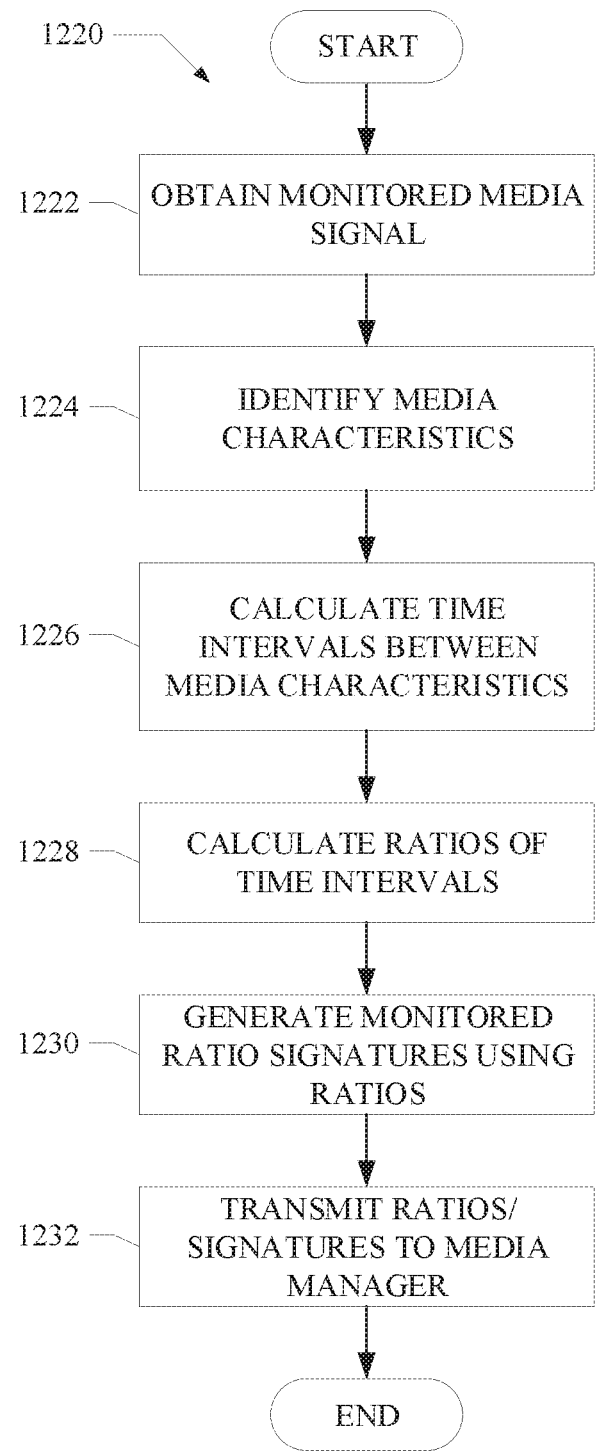
FIG. 12A
FIG. 12B

METHODS AND APPARATUS TO IDENTIFY AND CREDIT MEDIA USING RATIOS OF MEDIA CHARACTERISTICS

RELATED APPLICATIONS

This patent arises from a continuation of U.S. patent application Ser. No. 16/055,829, which is titled "METHODS AND APPARATUS TO IDENTIFY AND CREDIT MEDIA USING RATIOS OF MEDIA CHARACTERISTICS," which was filed on Aug. 6, 2018, and which is now U.S. Pat. No. 10,368,127, which is a continuation of U.S. patent application Ser. No. 15/234,904, which is titled "METHODS AND APPARATUS TO IDENTIFY AND CREDIT MEDIA USING RATIOS OF MEDIA CHARACTERISTICS," which was filed on Aug. 11, 2016, and which is now U.S. Pat. No. 10,045,075, which claims the benefit of U.S. Provisional Application Ser. No. 62/296,940, which is titled "METHODS AND APPARATUS TO IDENTIFY MEDIA USING RATIOS OF MEDIA CHARACTERISTICS." and which was filed on Feb. 18, 2016. Priority to U.S. patent application Ser. No. 16/055,829, U.S. patent application Ser. No. 15/234,904 and U.S. Provisional Application Ser. No. 62/296,940 is claimed. U.S. patent application Ser. No. 16/055,829, U.S. patent application Ser. No. 15/234,904 and U.S. Provisional Application Ser. No. 62/296,940 are hereby incorporated herein by reference in their respective entireties.

FIELD OF THE DISCLOSURE

This disclosure relates generally to media identification, and, more particularly, to methods and apparatus to identify and credit media using ratios of media characteristics.

BACKGROUND

In recent years, media playback devices have added features that change how media is viewed, recorded, played back, etc. For example, some media playback devices support time-compressed playback in which media can be played back at a rate that is faster than a normal playback rate.

BRIEF DESCRIPTION OF THE DRAWINGS

FIG. 12A is an example flow diagram representative of example machine-readable instructions that may be executed to implement the example reference signature generator of FIG. 2.

FIG. 12B is an example flow diagram representative of example machine-readable instructions that may be executed to implement the example meter of FIG. 2.

DETAILED DESCRIPTION

Modern media playback devices include features that allow a consumer to watch media at a faster rate than the rate at which the media was originally recorded or broadcast. For example, media can be played-back at a rate thirty percent faster (e.g., 1.3×) than the original playback rate (e.g., 1.0×).

Increasing the rate of media playback affects both the video and audio aspects of a presentation of the media. In terms of video frames, some video frames may be presented for a shorter duration. For example, instead of presenting 24 frames in 1 second (e.g. 24 frames per second ("fps")), or 1 frame approximately every 0.04 seconds (e.g., the National Television System Committee standard), the same 24 frames may be presented in 0.70 seconds (e.g., 34 fps), or 1 frame approximately every 0.03 seconds. Additionally or alternatively, video frames may be removed entirely. For example, skipping every fourth video frame (e.g., presenting three frames out of four) increases the playback rate to 1.5 times the original playback rate. Whether video frames are removed or presented for a shorter duration, the effect is increased motion throughout the media.

In terms of audio, increasing the rate of media playback increases the frequency of audio signals (e.g., at a 1.5 times original playback rate, a three-second sound is time-compressed to fit into two seconds). As a result, the audio pitch increases and distorts the original sound. To accommodate the modifications caused by an increased media playback rate, portions of the media may be removed and/or reprocessed such that the overall experience of the media played at an increased rate is not significantly altered from that of media played at the original playback rate.

Figure 1:
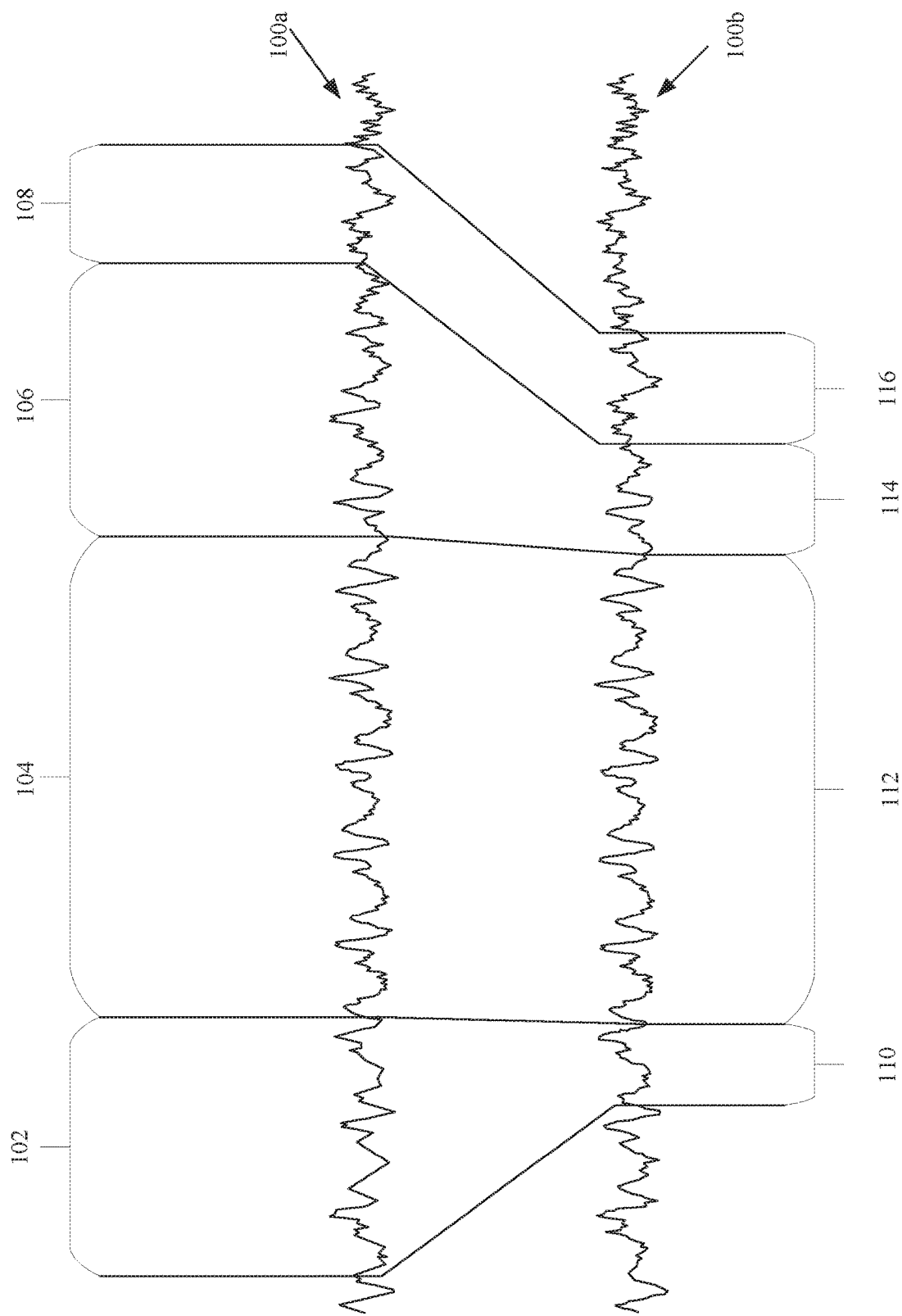
FIG. 1 is an illustration of a first example media signal and a time-compressed version of the first example media signal.

FIG. 1 illustrates a graph of an example original media signal 100a above an example time-compressed version 100b of the same media signal. The example graph of FIG. 1 is a close up of the example original media signal 100a and the example time-compressed signal 100b to show differences at the millisecond level. The example original media signal 100a includes media portions 102, 104, 106, and 108. The example time-compression version 100b includes corresponding media portions 110, 112, 114, and 116. As illustrated in FIG. 1, example time-compressed media portions 112 and 116 are time-compressed versions of example original media portions 104 and 108 created by increasing the playback speed of those original media portions, whereas example time-compressed media portion 110 is a time-compressed version of example original media portion 102 that has also been reprocessed and/or had parts of media signal removed. Similarly, example media portion 114 is a time-compressed version of example original media portion 106 that has also been reprocessed and/or had parts of media signal removed. Thus, example media portions 102 and 106 differ substantially from corresponding media portions 110 and 114, whereas media portions 112 and 116 are similar, but time-compressed versions of corresponding media portions 104 and 108.

Example methods and apparatus disclosed herein identify media in manners independent of the rate at which media is played back. For example, some example methods and apparatus determine ratios from time intervals between characteristics of media to generate signatures capable of identifying the media even after the media is compressed, reprocessed, and/or has had portions removed.

Example methods and apparatus disclosed herein identify first characteristics associated with reference media. The example reference media may be media capable of being provided and presented via an output device, such as, for example, a television, a radio, a computer, set top box, over the top device, mobile device, or other known output device. In some examples, the first characteristics are zero crossings of an audio or video reference signal corresponding to reference media. In some examples, the first characteristics are energy peaks in the reference media signal corresponding to the reference media. The example energy peaks may represent local maximum points in media waves (e.g., in the frequency and/or time domain), points that satisfy an example threshold, logical high values in digital signals, and/or other notable example characteristics associated with media signals. Some example methods and apparatus calculate a first time interval, or first delta, between a first one of the first characteristics and a second one of the first characteristics. Similarly, such example methods and apparatus calculate a second time interval, or second delta, between the second one of the first characteristics and a third one of the first characteristics. In some examples, the example methods and apparatus generate a reference delta signature based on a plurality (e.g., sequence) of such deltas between characteristics of the media signal.

In some examples, the example methods and apparatus determine a ratio between the first delta and the second delta. Such example methods and apparatus determine additional ratios between the deltas of the media signal. Such example methods and apparatus generate a reference ratio signature (also referred to herein as a reference time-compressed signature) based on a plurality (e.g., sequence) of such ratios of deltas between characteristics of the media signal for subsequent identification. Such example methods and apparatus disclosed herein generate such reference ratio signatures for a reference library of broadcast media and store the reference ratio signatures in an example database for future retrieval, matching, and identification of the media associated with a corresponding signature.

Additionally, some example methods and apparatus disclosed herein identify second characteristics associated with monitored media (e.g., media monitored by a metering device, also referred to herein as a meter) presented by an example output device. As similarly disclosed above, some example methods and apparatus disclosed herein generate a monitored media delta signature for the monitored media. Some example methods and apparatus disclosed herein generate a monitored media ratio signature (also referred to herein as a monitored signal time-compressed signature) for the monitored media based on sequences of ratios of time differences between the identified second characteristics, as disclosed above and in further detail below. In some example methods and apparatus, the meter reports such monitored media signatures to an audience measurement entity ("AME"), which compares the example monitored media ratio signature to a plurality of reference ratio signatures within the example database for matches. When the example monitored media ratio signature matches, or substantially matches, one of the plurality of reference ratio signatures within the example database, such example methods and apparatus disclosed herein identify the example monitored media based on the example matching reference ratio signature within the example database.

Some disclosed example methods and apparatus further identify a time-compression factor, if any, by dividing deltas associated with the example matching reference ratio signature by corresponding deltas associated with the example monitored media ratio signature. In some examples, the example methods and apparatus determine there is no time-compression when the time-compression factor is equal to one. In some examples where the time-compression factor is greater than one, the example methods and apparatus determine the monitored media was presented at a rate faster than a normal playback rate. In some examples where the time-compression factor is less than one, the example methods and apparatus determine the monitored media was presented at a rate slower than a normal playback rate. In some examples disclosed herein, the playback rate of the monitored media is associated with the time-compression factor.

Some example methods and apparatus disclosed herein determine a duration that the monitored media was presented. Some such example methods and apparatus determine the amount of time to credit the monitored media by multiplying the duration of the monitored media by the time-compression factor (e.g., determined by dividing the deltas associated with the matching reference ratio signature by the corresponding deltas associated with the monitored media ratio signature). In some examples, an example apparatus is located to perform disclosed example methods on-site (e.g., corresponding to a meter in proximity to the example output device). In some examples, an example apparatus is located to perform disclosed example methods off-site (e.g., data from the meter monitoring the example output device is reported to an AME's central processing facility for analysis).

Figure 2:
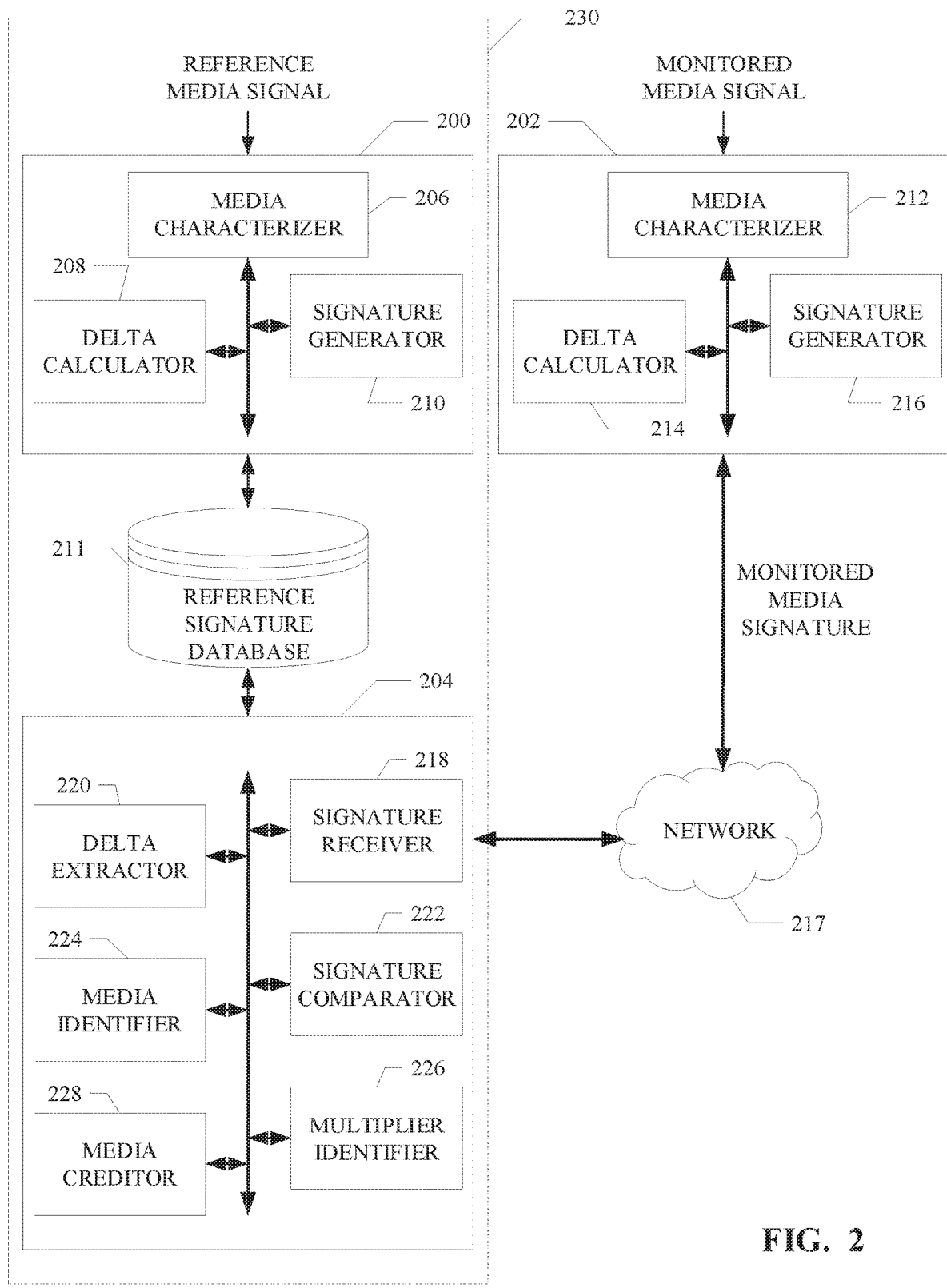
FIG. 2 is an example environment including an example reference signature generator, an example meter, and an example media manager to identify and credit media from media signals.
Figure 3:
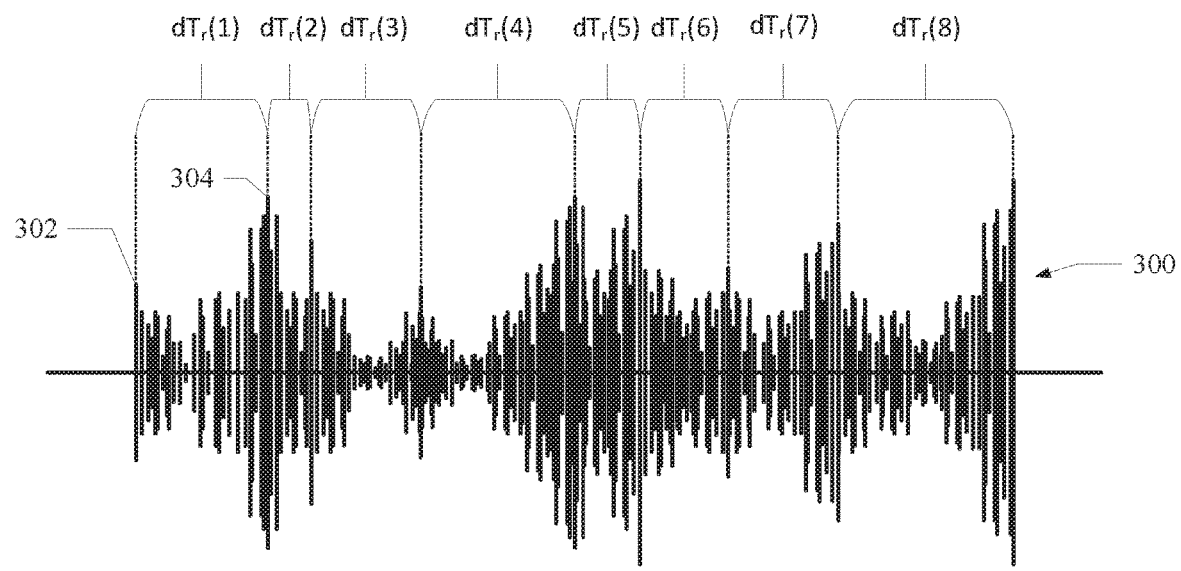
FIG. 3 illustrates an example reference media signal from which the example reference signature generator of FIG. 2 generates an example reference ratio signature.

FIG. 2 is an example environment including an example reference signature generator 200, an example meter 202, and an example media manager 204 to identify and credit media. In the illustrated example, the example reference signature generator 200 is separate from the example media manager 204. In some examples, the example reference signature generator 200 and the example media manager 204 may be combined.

The example reference signature generator 200 generates reference ratio signatures from reference media such that the reference media is capable of subsequent identification based on the example reference ratio signatures. Some example methods of identification include audio watermarking and signature based techniques. Audio watermarking is a technique used to identify media such as television broadcasts, radio broadcasts, advertisements (television and/or radio), downloaded media, streaming media prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The example reference signature generator 200 of FIG. 2 includes an example media characterizer 206, an example delta calculator 208, and an example signature generator 210. The example media characterizer 206 identifies characteristics of an example reference media signal. For example, the example media characterizer 206 identifies temporal characteristics of the example reference media signal, such as, for example, times (e.g., timestamps, start time, stop time, duration), local peak signal magnitudes satisfying an example threshold, zero crossings, logical highs, logical lows, integrations and/or derivatives thereof, or other known characteristics of the example media signal. The example media characterizer 206 may include a clock to keep track of actual time independent of the time associated with the reference media signals.

The example delta calculator 208 determines a time interval or delta $dTr(1)$ between adjacent temporal characteristics identified by the example media characterizer 206. The example delta calculator 208 determines one or more deltas $dTr(2)$, $dTr(3)$, $dTr(4)$, $dTr(5)$, $dTr(6)$, $dTr(7)$, $dTr(8)$ for generation of a reference delta signature as further disclosed below. The example delta calculator 208 additionally determines ratios $dRr(1)$, $dRr(2)$, $dRr(3)$, $dRr(4)$, $dRr(5)$, $dRr(6)$, $dRr(7)$ between identified deltas $dTr(1)$, $dTr(2)$, $dTr(3)$, $dTr(4)$, $dTr(5)$, $dTr(6)$, $dTr(7)$, $dTr(8)$ of the reference media signal for generation of a reference ratio signature as further disclosed below. For example, the example delta calculator 208 determines a ratio between a first delta $dTr(1)$ and a nearest delta $dTr(2)$, (e.g., $dTr(1)/dTr(2)$ or, more generally, $dTr(n)/dTr(n+1)$). Of course, the example delta calculator 208 may determine alternative ratios, such as, for example, ratios between a first delta and a second nearest delta (e.g., $dTr(1)/dTr(3)$ or, more generally, $dTr(n)/dTr(n+2)$), ratios between a first delta $dTr(1)$ and a combination of the first delta $dTr(1)$ and the nearest delta $dTr(2)$ (e.g., $dTr(1)/(dTr(1)+dTr(2)$ or, more generally, $dTr(n)/(dTr(n)+dTr(n+1))$, etc.

In some examples, the example signature generator 210 combines a plurality (e.g., sequence) of the deltas determined for a reference media signal into a reference delta signature representative of that media signal. In some examples, the example signature generator 210 also combines a plurality (e.g., sequence) of the ratios determined for the reference media signal into a reference time-compressed or ratio signature representative of the media signal. The example signature generator 210 transmits (e.g., via a network) generated reference delta signatures and/or corresponding reference ratio signatures to an example reference signature database 211. In some examples, the example signature generator 210 transmits (e.g., via a network) the generated reference delta signatures and/or corresponding reference ratio signatures to the example media manager 204. Additionally or alternatively, the example media manager 204 may generate the reference ratio signatures based on the deltas calculated by the example delta calculator 208 and/or the reference delta signatures generated by the example signature generator 210.

The example reference signature database 211 is a storage device containing example reference delta signatures and/or corresponding reference ratio signatures generated by the example reference signature generator 200. The example reference delta signatures and/or corresponding reference ratio signatures stored in the example reference signature database 211 are associated with the respective reference media in such a way to subsequently identify the reference media based on the example reference delta signatures and/or corresponding reference ratio signatures.

The example meter 202 may be a local meter in proximity with an output device to analyze media signals and report the results to a central facility. In some examples, the example meter 202 is similar to the example reference signature generator 200 and includes an example media characterizer 212, an example delta calculator 214, and an example signature generator 216. In some example, the example meter 202 receives a monitored media signal to meter, monitor, characterize, and generate a monitored media ratio signature therefrom, similarly to the example reference signature generator 200. The example meter 202 may be one of a plurality of example meters 202 distributed around a population (e.g., a panel) to monitor media presented to the population (e.g., panelists). In some examples, the example meter 202 monitors media at a household level. In some examples, the example meter 202 monitors media at an individual level.

The example media characterizer 212 identifies characteristics of an example monitored media signal. For example, the example media characterizer 212 identifies temporal characteristics of the example monitored media signal, such as, for example, times (e.g., timestamps, start time, stop time, duration), local peak signal magnitudes satisfying an example threshold, zero crossings, logical highs, logical lows, integrations and/or derivatives thereof, or other known characteristics of the example media signal. The example media characterizer 212 may include a clock to keep track of actual time independent of the time associated with the monitored media signals. In some examples, the media characterizer 212 transmits media characteristics to the example media manager 204.

The example delta calculator 214 determines a delta dTm(1) from adjacent identified temporal characteristics identified by the media characterizer 212. The example delta calculator 214 determines one or more deltas dTm(2), dTm(3), dTm(4), dTm(5), dTm(6), dTm(7), dTm(8) in a similar manner for generation of a monitored media delta signature. In some examples, the example delta calculator 214 additionally determines ratios dRm(1), dRm(2), dRm(3), dRm(4), dRm(5), dRm(6), dRm(7) between identified deltas dTm(1), dTm(2), dTm(3), dTm(4), dTm(5), dTm(6), dTm(7), dTm(8), etc. of the monitored media signal for generation of a monitored media ratio signature. For example, the example delta calculator 214 determines a ratio between a first delta dTm(1) and a nearest delta dTm(2), (e.g., dTm(1)/dTm(2) or, more generally, dTm(n)/dTm(n+1)). Of course, the example delta calculator 214 may determine alternative ratios, such as, for example, ratios between a first delta and a second nearest delta (e.g., dTm(1)/dTm(3) or, more generally, dTm(n)/dTm(n+2)), ratios between a first delta dTm(1) and a combination of the first delta dTm(1) and the nearest delta dTm(2) (e.g., dTm(1)/(dTm(1)+dTm(2) or, more generally, dTm(n)/(dTm(n)+dTm(n+1)), etc.

The example signature generator 216 combines (e.g., groups) a plurality (e.g., sequence) of the deltas determined for a monitored media signal into a monitored media delta signature representative of that media signal. The example signature generator 216 also combines (e.g., groups) a plurality (e.g., sequence) of the ratios determined for a monitored media signal into a monitored media ratio signature representative of that media signal. In some examples, the example signature generator 216 transmits generated monitored media delta signatures and/or corresponding monitored media ratio signatures to the example media manager 204 via a network 217 (e.g., cellular network, the Internet, local-area network, etc.). Additionally or alternatively, the example media manager 204 may generate the monitored media ratio signatures based on deltas calculated by the example delta calculator 214 and forming the monitored media delta signatures reported by the meter 202.

The example media manager 204 includes an example signature receiver 218, an example delta extractor 220, an example signature comparator 222, an example media identifier 224, an example multiplier identifier 226, and an example media creditor 228.

The example signature receiver 218 obtains reference ratio signatures from the example reference signature database 211 and/or monitored media ratio signatures from the example meter 202. In some examples, the example signature receiver 218 obtains reference delta signatures from the example reference signature database 211 and/or monitored media delta signatures from the example meter 202. In some examples, the example signature receiver 218 sends reference delta/ratio signatures and monitored media delta/ratio signatures to the example signature comparator 222 for comparison and signature matching.

In some examples, the example meter 202 determines the monitored ratios and/or a monitored media ratio signature based on the monitored ratios and sends the monitored ratios and/or monitored media ratio signature to the example media manager 204. In some examples, the example meter 202 sends the monitored deltas and/or a monitored media delta signature based on the monitored deltas to the example media manager 204. In such examples, the delta extractor 220 extracts deltas dTm(1), dTm(2), dTm(3), dTm(4), dTm(5), dTm(6), dTm(7), dTm(8) sent from the example meter 202 and generates a monitored media ratio signature. For example, the delta extractor 220 generates ratios dRm(1), dRm(2), dRm(3), dRm(4), dRm(5), dRm(6), dRm(7) based on the extracted deltas. The example delta extractor 220 generates ratios and/or ratio signatures as discussed in connection with the example delta calculator 208 and/or the example delta calculator 214. Accordingly, such description will not be repeated and the interested reader is referred to the corresponding description in connection with the example delta calculator 208 and/or the example delta calculator 214. In such examples, the delta extractor 220 transmits the monitored media ratio signature to the example signature comparator 222.

In some examples, in response to receiving a monitored media ratio signature, the example signature comparator 222 searches the example reference signature database 211 for reference ratio signatures matching the example monitored media ratio signature. The example signature comparator 210 utilizes the ratios that make up the respective ratio signatures to identify matches. For example, the example signature comparator 210 may identify a match between a reference ratio signature and a monitored media ratio signature when the corresponding ratios between the two signatures are identical, substantially similar, match a threshold number of times, etc.

The example media identifier 224 identifies a reference media associated with a reference ratio signature when the example signature comparator 222 identifies the reference ratio signature as a match to the monitored media ratio signature. The example media identifier 212 additionally associates the identified reference media with the monitored media for subsequent crediting.

In some examples, the example delta extractor 220 extracts deltas from ratios matched by the example signature comparator 222 in order to determine a time-compression factor or multiplier $M_{TC}$ (if any) that was applied to the monitored media signal. The example multiplier identifier 226 determines the multiplier by dividing the deltas associated with the ratios from the reference ratio signature that matches the monitored media ratio signature by the corresponding deltas associated with the ratios from the monitored media ratio signature that match the reference ratio signature. Additionally or alternatively, the example multiplier identifier 226 may determine the example multiplier by dividing an amount of media presented (e.g., the difference between timestamps of media) by the amount of time for which the media was presented. In some examples, the example multiplier identifier 226 identifies the duration of the monitored media (e.g., from the example media characterizer 212) and applies the multiplier to the duration to determine a crediting duration.

The example media creditor 228 receives the media identification from the example media identifier 224 and combines it with the crediting duration determined by the example multiplier identifier 226 to determine what was presented and for how long, and to credit the same.

The example reference signature generator 200, the example media manager 204, and the example reference signature database 211 may be operated by an example AME 230. In some examples, the example media manager 204 is located at a central facility, while the example meter 202 is located in a different location (e.g., in a panelist's home).

In operation, the example reference signature generator 200 receives reference media signals and generates reference signatures (e.g., reference delta and/or ratio signatures) from the reference media signals to associate media with reference signatures. Additionally, the example meter 202 receives monitored media signals, generates signatures (e.g., monitored media delta and/or ratio signatures) for the monitored media, and sends the monitored media ratio signatures and other monitored media information via a network, such as, for example, the Internet, to the example media manager 204. The example media manager 204 compares monitored media ratio signatures to reference ratio signatures to identify and credit the monitored media based on reference media.

Figure 4:
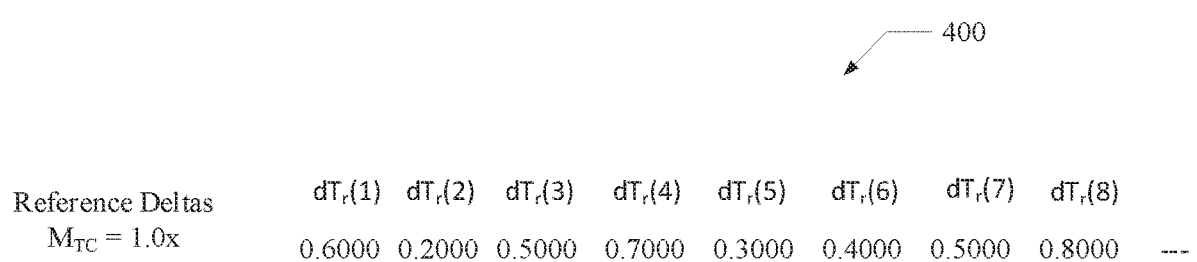
FIG. 4 is a table of time differences forming the example reference ratio signature representative of the example reference media signal of FIG. 3.

With reference to FIGS. 3-10, the example media characterizer 206 of the example reference signature generator 200 receives an example reference media signal 300. The example delta calculator 208 determines reference time intervals or reference deltas dTr(1), dTr(2), dTr(3), dTr(4), dTr(5), dTr(6), dTr(7), dTr(8) (FIG. 3) between characteristics of the example reference media signal 300 identified by the example media characterizer 206. In some examples wherein the example media characterizer 206 identifies local peak signal magnitudes, the example delta calculator 208 determines reference deltas between a first peak signal magnitude 302 and a nearest peak signal magnitude 304, and so on. Example values of the reference deltas determined by the example delta calculator 208 for the example reference media signal 300 are shown in table 400 of FIG. 4. For example, the reference deltas between adjacent identified characteristics for the example reference media signal 300 may be 0.6000, 0.2000, 0.5000, 0.7000, 0.3000, 0.4000, 0.5000, 0.8000, etc., as shown in FIG. 4.

Figures 5, 6:
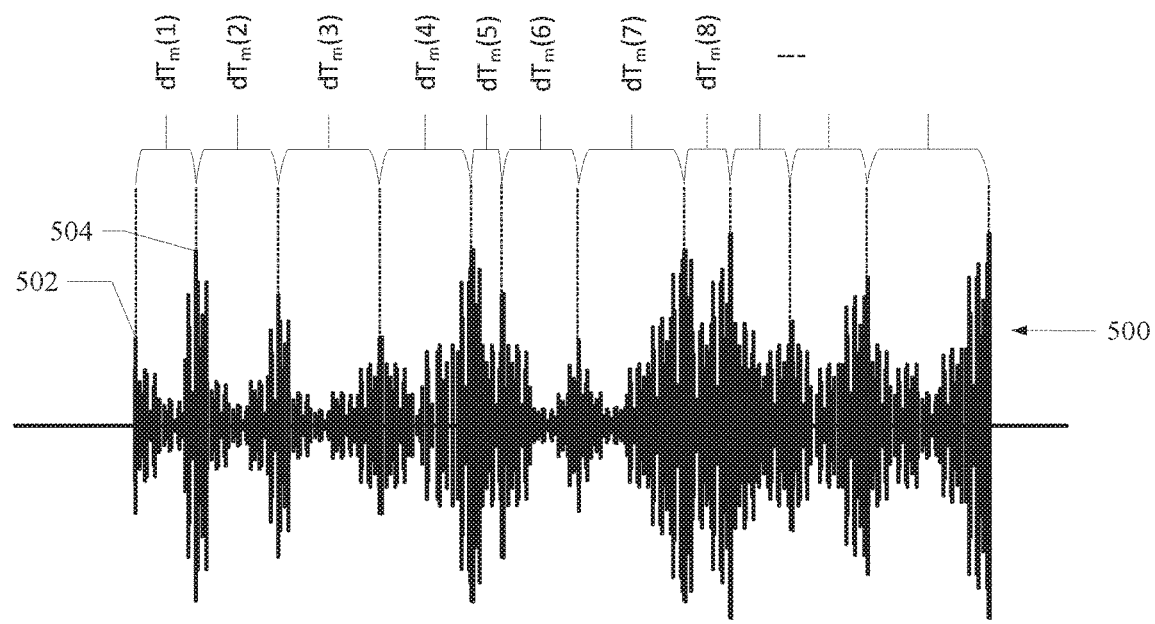
FIG. 5 illustrates an example monitored media signal from which the example meter of FIG. 2 generates an example monitored media ratio signature.
FIG. 6 is a table of time differences forming the example monitored media ratio signature representative of the example monitored media signal of FIG. 5.

As shown in FIG. 5, the example meter 202 determines characteristics of an example monitored media signal 500, such as peak magnitudes 502, 504. The example meter 202 determines a metered time interval or metered delta dTm(1) from the peak magnitudes 502, 504 of the example monitored media signal 500. The example meter 202 determines monitored deltas dTm(2), dTm(3), dTm(4), dTm(5), dTm(6), dTm(7), dTm(8), etc. (FIG. 5), between subsequent adjacent identified characteristics in a similar manner. Example values of the monitored deltas determined by the example delta calculator 214 for the example monitored media signal 500 are shown in table 600 of FIG. 6. For example, the monitored media deltas between adjacent identified characteristics for the example monitored media signal 500 may be 0.3083, 0.3927, 0.4874, 0.4286, 0.1426, 0.3571, 0.5000, 0.2143, etc., as shown in FIG. 6.

Figure 7:
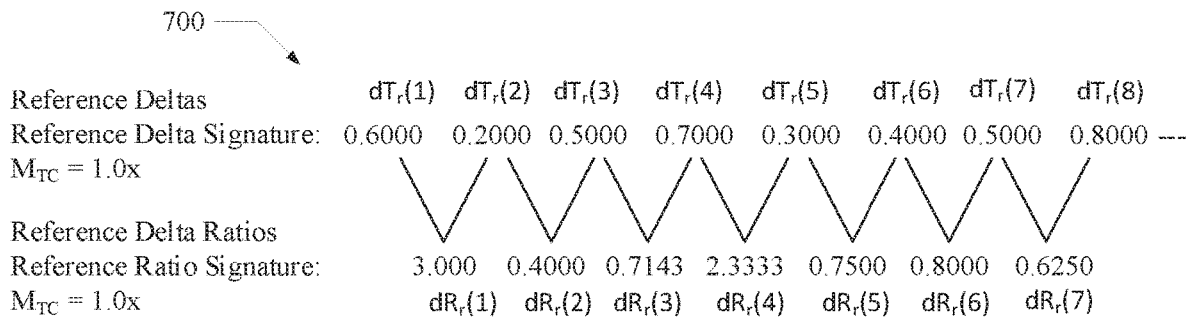
FIG. 7 is a table of the reference time differences of FIG. 4 and corresponding ratios of the reference time differences of FIG. 4.

As shown in table 700 of FIG. 7, the example delta calculator 208 of the example reference signature generator 200 determines reference ratios dRr(1), dRr(2), dRr(3), dRr(4), dRr(5), dRr(6), dRr(7) from the adjacent reference deltas dTr(1), dTr(2), dTr(3), dTr(4), dTr(5), dTr(6), dTr(7), dTr(8) for the reference ratio signature. For example, dRr(1)=dTr(1)/dTr(2)=0.6000/0.2000=3.000; dRr(2)=dTr(2)/dTr(3)=0.2000/0.5000=0.4000; etc. (FIG. 7). An example reference ratio signature for the example reference media signal 300 may be a sequence of ratios determined by the example delta calculator 214, such as 3.000, 0.4000, 0.7143, 2.3333, 0.7500, 0.8000, 0.6250, etc., as illustrated in FIG. 9.

Figure 8:
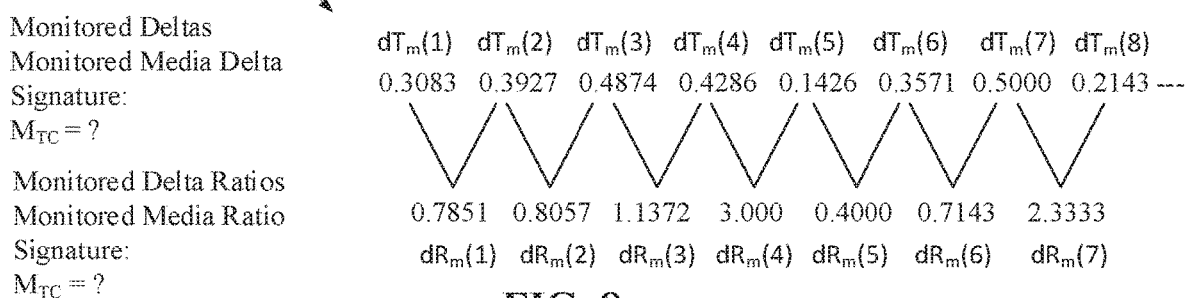
FIG. 8 is a table of the monitored time differences of FIG. 6 and corresponding ratios of the monitored time differences of FIG. 6.

As shown in table 800 of FIG. 8, the example delta calculator 214 of the example meter 202 determines monitored ratios dRm(1), dRm(2), dRm(3), dRm(4), dRm(5), dRm(6), dRm(7) from the adjacent monitored deltas dTm(1), dTm(2), dTm(3), dTm(4), dTm(5), dTm(6), dTm(7), dTm(8) for the monitored media ratio signature. For example, dRm(4)=dTm(4)/dTm(5)=0.4286/0.1426=3.000; dRm(5)=dTm(5)/dTm(6)=0.1426/0.3571=0.4000; etc. (FIG. 8). An example monitored media ratio signature for the example monitored media signal 500 may be 0.7851, 0.8057, 1.1372, 3.000, 0.4000, 0.7143, 2.3333, etc. as illustrated in FIG. 9.

In some examples, the example signature generator 216 of the example meter 202 generates a monitored media ratio signature based on the monitored deltas and sends (e.g., via the network 217) the monitored media ratio signature to the example media manager 204. In some examples, the example signature generator 216 of the example meter 202 generates a monitored media ratio signature based on the monitored ratios and sends (e.g., via the network 217) the monitored media ratio signature to the example media manager 204.

Figure 9:
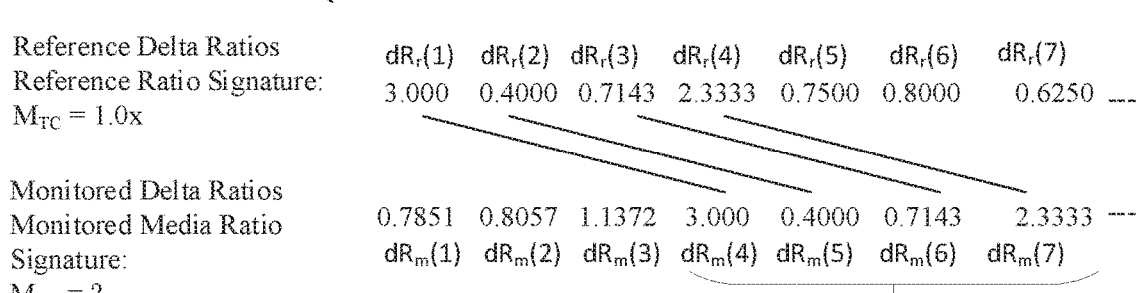
FIG. 9 is a table matching the reference ratios of FIG. 7 to the monitored ratios of FIG. 8.

As shown in table 900 in FIG. 9, upon receiving the monitored media ratio signature, the example signature comparator 222 of the example media manager 204 searches the example reference signature database 211 for a reference ratio signature matching the example monitored media ratio signature. For example, the example monitored media ratio signature with ratios dRm(4), dRm(5), etc. identified in FIG. 8 is compared to the example reference ratio signature with ratios dRr(1), dRr(2), etc. identified in FIG. 7. In such examples, the example signature comparator 222 identifies that the example monitored media ratio signature matches one or more ratios in the example reference ratio signature (e.g., dRm(4) matches dRr(1) and dRm(5) matches dRr(2)).

Figure 10:
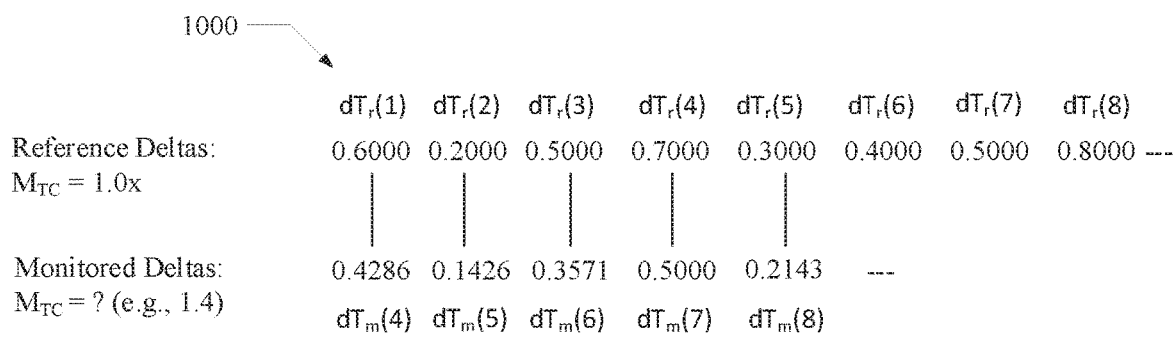
FIG. 10 is a table of the time differences of FIG. 4 and corresponding time differences of FIG. 6 having ratios matched according to FIG. 9.

Thereafter, the example delta extractor 220 identifies the corresponding deltas (e.g., dTr(1), dTr(2), dTr(3), dTr(4), dTr(5) and dTm(4), dTm(5), dTm(6), dTm(7), dTm(8)) associated with matching ratios. As shown in FIGS. 9-10, the first ratio from the reference ratio signature may not match with the first ratio from the monitored media signal. However, at least a portion of the ratios that make up the reference ratio signature should be identified within the ratios of the monitored media ratio signature if they are the same media. In other words, the ratios of the monitored media ratio signature will eventually align with the ratios in the reference ratio signature, as shown in FIG. 9, when the monitored media is the same as a reference media.

The example multiplier identifier 226 identifies whether the monitored media is time-compressed (and by how much) by dividing the matching reference deltas by the matching monitored media deltas (e.g., dTr( )/dTm(4), dTr(2)/dTm(5), dTr(3)/dTm(6), dTr(4)/dTm(7), dTr(5)/dTm(8)) (FIG. 10). For example, the example multiplier identifier 214 identifies the multiplier: $M_{TC}(1)$=dTr(1)/dTm(4)=0.6000/0.4286=1.39, $M_{TC}(2)$=dTr(2)/dTm(5)=0.2000/0.1426=1.40, etc. In the illustrated example, the $M_{TC}$ is consistently 1.40, however, the $M_{TC}$ may change throughout a media signal (e.g., depending on user operation of the output device through which media is monitored and/or the meter). For example, $M_{TC}(1)$ may be 1.4, while $M_{TC}(2)$ is 1.0 and $M_{TC}(3)$ is 1.3. The example multiplier identifier 226 can determine the multiplier over time (e.g., on a second-to-second or minute-to-minute basis) or may be event driven (e.g., upon a signal that the playback rate has changed).

Figures 11A, 11B:
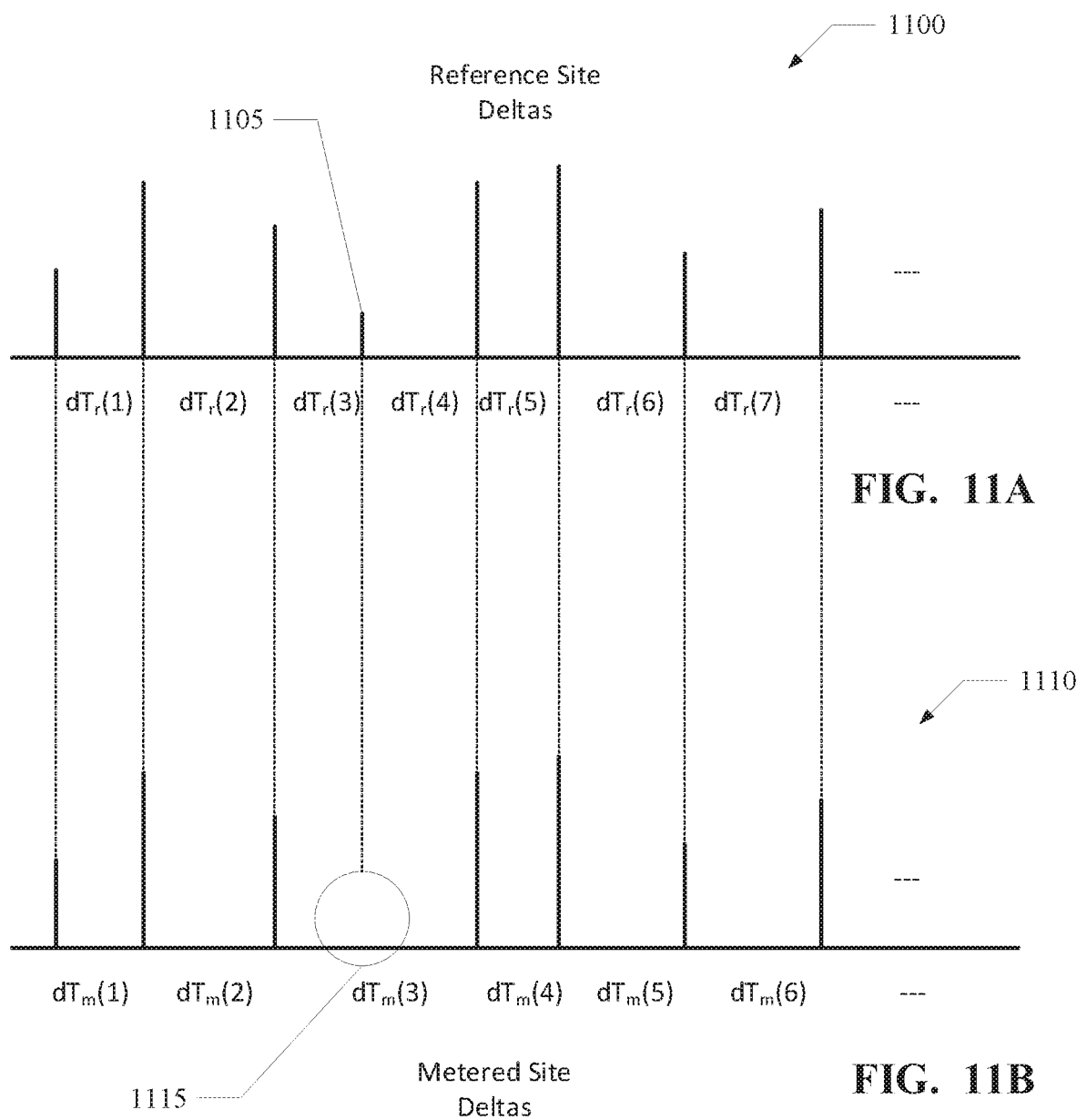
FIG. 11A illustrates example energy peaks of an example reference ratio signature.
FIG. 11B illustrates example energy peaks of an example monitored media ratio signature differing from the example reference ratio signature of FIG. 11A.

In some examples, as shown in FIGS. 11A-11B, an example reference media signal 1100 slightly differs from an example monitored media signal 1110. In some examples, either the example reference media signal 1100 or the example monitored media signal 1110 are altered, such as by external circumstances (e.g., equalization, volume fluctuation, noise cancellation, interference, etc.). In the illustrated example, an example characteristic (e.g., energy peak) 1105 from example reference media signal 1100 was not metered (e.g., missing in the corresponding monitored media signal) in the example monitored media signal 1110, as indicated by reference numeral 1115. Of course, the example reference media signal 1100 could also have missing characteristics. When missing characteristics occur in the example monitored media signal 1110, the corresponding deltas (and delta signatures) and the corresponding ratios (and ratio signatures) are likewise affected.

For example, as shown in FIGS. 11A-11B, the third delta for the example monitored media signal 1110 would be equal to the combination of the third and fourth deltas for the example reference signal 1100 when the example monitored media signal 1110 is missing the energy peak that should have appeared at reference numeral 1115. When the deltas differ, the corresponding delta signatures will differ, potentially leading to false negatives in delta signature matching. Also when the deltas differ, the resulting ratios of the deltas would also differ, potentially leading to false negatives in ratio signature matching.

Figure 15:
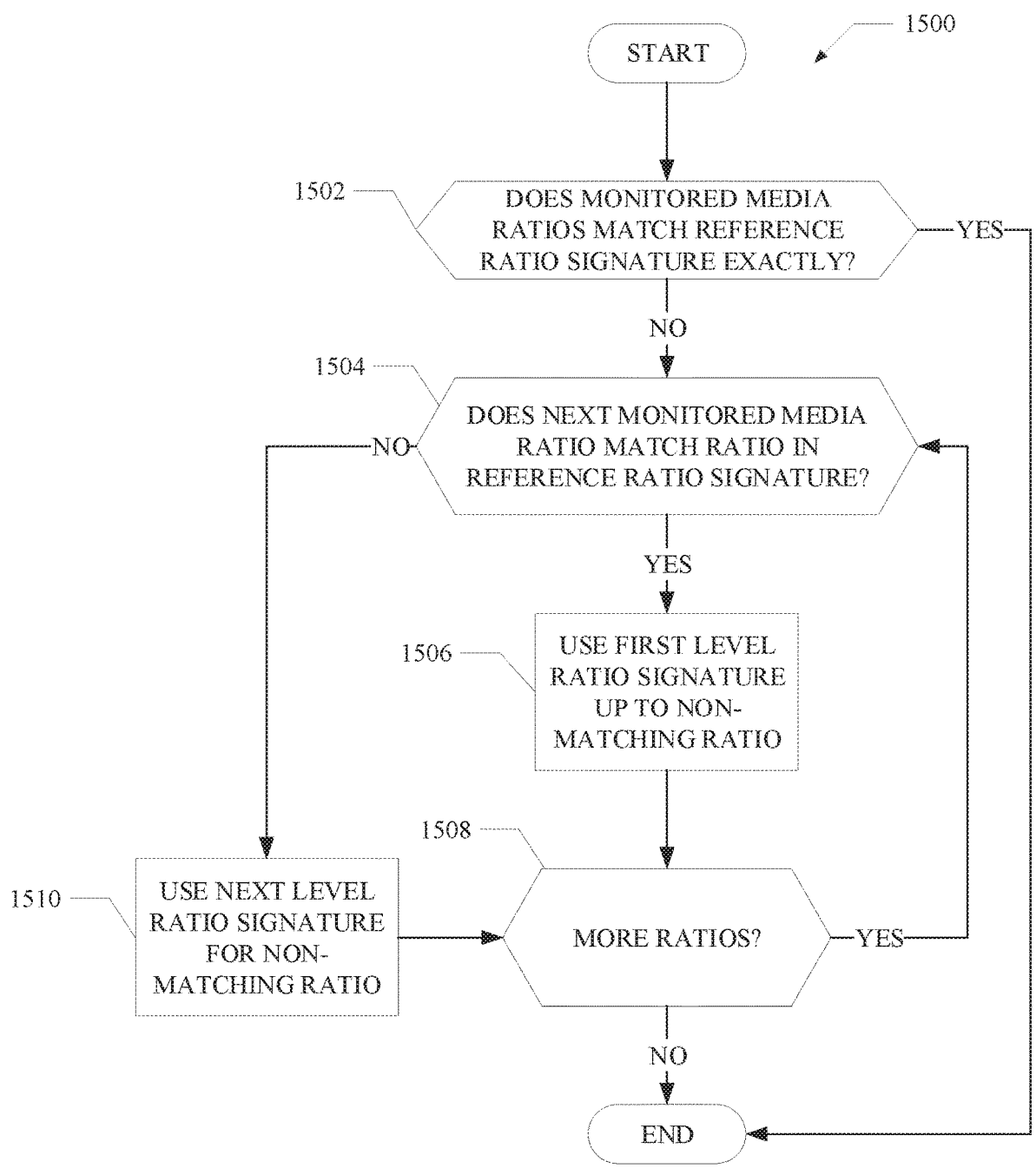

In some such examples, as further discussed in conjunction with FIG. 15, the example signature comparator 210 utilizes a first level reference ratio signature to match ratios in the monitored media ratio signature up until an error occurs (e.g., the deltas and/or the ratios of the monitored media ratio signature do not match the reference ratio signature). In some examples, the first level reference ratio signature includes reference ratios defined as: dTr(n)/(dTr(n)+dTr(n+1)). This is compared to a monitored media ratio signature that includes monitored media ratios defined as dTm(n)/(dTm(n)+dTm(n+1)). Where there is an error in the monitored media ratio signature (e.g., due to a missing energy peak in the monitored media signal), the example signature comparator 210 utilizes a second level reference ratio signature to match ratios in the monitored media ratio signature to ratios in the reference ratio signatures. In some examples, the second level reference ratio signature includes ratios defined as: dTr(n)/(dTr(n)+dTr(n+1)+dTr(n+2)). This is compared to the monitored media ratio signature that includes ratios defined as dTm(n)/(dTm(n)+dTm(n+1)).

As shown in FIGS. 11A-11B, an example ratio from the second level reference ratio signature at point dRr(2) would be dTr(2)/(dTr(2)+dTr(3)+dTr(4)) while an example ratio from the monitored media ratio signature at point dRm(2) would be dTm(2)/(dTm(2)+dTm(3)). In the illustrated example, these ratios would be the same even though the monitored media signal is missing a characteristic (e.g., an energy peak). Additional levels of ratios may be used to correct for additional errors, without departing from the scope of the present disclosure.

In some examples, an extra characteristic (e.g., energy peak) appears in the monitored media signal 1110. Of course, an extra characteristic may appear in the reference media signal 1100. In examples wherein the example monitored media signal 1110 includes an extra characteristic, the example signature comparator 222 may utilize a first level monitored media ratio signature to match ratios in the monitored media ratio signature to reference ratio signatures. In some examples, the first level monitored media ratio signature includes ratios defined as: dTm(n)/(dTm(n)+dTm(n+1)). This is compared to a reference ratio signature that includes ratios defined as dTr(n)/(dTr(n)+dTr(n+1)). Similarly as disclosed above, the example signature comparator 222 may utilize a second level monitored media ratio signature to match ratios in the monitored media ratio signature. In some examples, the second level monitored media ratio signature includes ratios defined as: dTm(n)/(dTm(n)+dTm(n+1)+dTm(n+2)). This is compared to the reference ratio signature that includes ratios defined as dTr(n)/(dTr(n)+dTr(n+1)).

An example ratio from the second level monitored media ratio signature at point dRm(2) would be dTm(2)/(dTm(2)+dTm(3)+dTm(4)) while an example ratio from the reference ratio signature at dRr(2) would be dTr(2)/(dTr(2)+dTr(3)). In such an example, the reference delta dTr(3) is equal to dTm(3)+dTm(4). These methods allow the example signature comparator 222 to match monitored media ratio signatures to reference ratio signatures when errors occur in the monitored media signal. Of course, the methods and apparatus disclosed herein can identify matches for monitored media signals with any combinations of missing or extra characteristics.

As disclosed above, missing and/or extra characteristics may appear in the example reference media signal 1100 and/or the example monitored media signal 1110. In examples wherein the example reference media signal 1100 (or example monitored media signal 1110) includes an extra characteristic, it may appear that the example monitored media signal 1110 (or example reference media signal 1100) is missing that extra characteristic. In examples wherein the example reference media signal 1100 (or example monitored media signal 1110) is missing a characteristic, it may appear that the example monitored media signal 1110 (or example reference media signal 1100) includes an extra characteristic. However, the example signature comparator 222 can identify matches between the example reference media ratio signature and the example monitored media ratio signature by utilizing the multiple level definitions of respective reference media ratio signatures or monitored media ratio signatures. For example, when the reference media signal is missing a characteristic, the example signature comparator 222 utilizes the second level monitored media ratio signature and when the monitored media signal is missing a characteristic, the example signature comparator 222 utilizes the second level reference media ratio signature. Similarly, when the reference media signal has an extra characteristic, the example signature comparator 222 utilizes the second level reference ratio signature and when the monitored media signal has an extra characteristic, the example signature comparator 222 utilizes the second level monitored media ratio signature.

In some examples, the example meter 202 transmits monitored media deltas to the example media manager 204.

In such examples, the signature comparator 222 of the example media manager 204 searches for reference delta signatures matching the monitored media deltas. The example signature comparator 222 compares the monitored media deltas to reference deltas in the example reference signature database 211 for matches. If the example signature comparator 222 does not identify a match, the example media manager 204 may determine that the monitored media is associated with a time-compression factor or multiplier. In such examples, the example delta extractor 220 of the example media manager 204 multiplies the monitored media deltas by example multipliers (e.g., the example multipliers can be less than one, one, or greater than one and may be multiples of 0.01, 0.05, 0.1, etc.) to create a plurality of multiplier monitored media delta signatures (e.g., instead of, or in addition to, using ratio signatures). For example, the example media manager 204 may create a multiplier monitored media delta signature with a 1.1× multiplier, a 0.95× multiplier, a 1.3× multiplier, etc.

Alternatively, the example delta extractor 220 may create the plurality of multiplier monitored media delta signatures prior to searching for reference delta signatures matching the monitored media deltas. Thereafter, the example signature comparator 222 may search against the example reference signature database 211 for reference delta signatures matching the monitored media deltas or any of the plurality of multiplier monitored media delta signatures.

In some examples, the matching of the plurality of multiplier monitored media delta signatures may be performed in parallel. In some examples, the above-disclosed process may be performed iteratively (e.g., one multiplier monitored media delta signature is compared to the reference signature database at a time) until a match is found. In such examples, the matching conditions may be relaxed (e.g., only a threshold number of deltas need to match (e.g., 85%)). In some examples, the example meter 202 may perform the application of the multipliers to the example monitored media deltas and transmit the same to the example media manager 204.

In some examples, the example media manager 204 creates a plurality of reference delta signature databases based on the example reference signature database 211. The example media manager 204 may apply pre-determined time-compression multipliers to delta signatures in the example reference signature database 211 to create multiplier reference delta signature databases. For example, the example media manager 204 may divide the deltas in the baseline reference delta signature within the example reference signature database 211 by example multipliers to create numerous multiplier reference delta signature databases storing respective reference signatures having deltas that are time scaled by the respective multipliers.

The example multipliers may be less than one, equal to one, or greater than one. For example, an example multiplier that is less than one may correspond to a decreased playback rate, and example multiplier that is equal to one may correspond to a normal playback rate, and an example multiplier greater than one may correspond to an increased playback rate. The example multipliers may be multiples of 0.01, 0.05, 0.1, etc.

In such examples, the example meter 202 transmits monitored media deltas (e.g., a monitored media delta signature) to the example media manager 204. In some such examples, the example signature comparator 222 searches for reference delta signatures matching the monitored media deltas. The example signature comparator 222 compares the monitored media deltas to reference deltas in the example reference signature database 211 for matches. If the example signature comparator 222 does not identify a match, the example media manager 204 determines that the monitored media is time-compressed. The example signature comparator 222 may iteratively search through the example multiplier reference delta signature databases storing reference delta signatures with differently scaled deltas until a match is found. Once a match is found, the example media manager 204 may identify the multiplier and credit media as described herein.

In some examples, the example delta extractor 220 may apply (e.g., by multiplying or dividing) the example multipliers to the deltas in the baseline reference delta signature within the example reference signature database 211 to create numerous multiplier reference delta signature databases storing respective reference signatures having deltas that are time scaled by the respective multipliers. In some examples, the example media manager 204 may apply (e.g., by multiplying or dividing) the example multipliers to the monitored media deltas to create a plurality of multiplier monitored media delta signatures.

While example manners of implementing the example reference signature generator 200, the example meter 202, and/or the example media manager 204 are illustrated in FIG. 2, one or more of the elements, processes and/or devices illustrated in FIG. 2 may be combined, divided, re-arranged, omitted, eliminated and/or implemented in any other way. Further, the example media characterizer 206, the example delta calculator 208, the example signature generator 210, and/or, more generally, the example reference signature generator 200 of FIG. 2; the example media characterizer 212, the example delta calculator 214, the example signature generator 216, and/or, more generally, the example meter 202 of FIG. 2; and the example signature receiver 218, the example delta extractor 220, the example signature comparator 222, the example media identifier 224, the example multiplier identifier 226, the example media creditor 228, and/or, more generally, the example media manager 204 of FIG. 2 may be implemented by hardware, software, firmware and/or any combination of hardware, software and/or firmware. Thus, for example, any of the example media characterizer 206, the example delta calculator 208, the example signature generator 210, and/or, more generally, the example reference signature generator 200 of FIG. 2; the example media characterizer 212, the example delta calculator 214, the example signature generator 216, and/or, more generally, the example meter 202 of FIG. 2; and the example signature receiver 218, the example delta extractor 220, the example signature comparator 222, the example media identifier 224, the example multiplier identifier 226, the example media creditor 228, and/or, more generally, the example media manager 204 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media characterizer 206, the example delta calculator 208, the example signature generator 210, and/or, more generally, the example reference signature generator 200 of FIG. 2; the example media characterizer 212, the example delta calculator 214, the example signature generator 216, and/or, more generally, the example meter 202 of FIG. 2; and the example signature receiver 218, the example delta extractor 220, the example signature comparator 222, the example media identifier 224, the example multiplier identifier 226, the example media creditor 228, and/or, more generally, the example media manager 204 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference signature generator 200, the example meter 204, and/or the example media manager 204 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example reference signature generator 200, the example meter 204, and/or the example media manager 204 of FIG. 2 are shown in FIGS. 12A-15. In these example, the machine readable instructions comprise programs for execution by a processor such as the processor 1612 shown in the example processor platform 1600 discussed below in connection with FIG. 16. The programs may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 12A-15, many other methods of implementing the example media manager 200 may alternatively be used. For example, the order of execution of the blocks may be changed, and/or some of the blocks described may be changed, eliminated, or combined.

As mentioned above, the example processes of FIGS. 12A-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 12A-15 may be implemented using coded instructions (e.g., computer and/or machine readable instructions) stored on a non-transitory computer and/or machine readable medium such as a hard disk drive, a flash memory, a read-only memory, a compact disk a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 12A is an example flow diagram representative of example machine-readable instructions 1200 that may be executed to implement the example reference signature generator 200 of FIG. 2. At block 1202, the example media characterizer 206 obtains and analyzes a reference media signal. The example reference media signal may be for signature generation purposes, media identification purposes, media crediting purposes, etc. In the illustrated example, the example media characterizer 206 identifies media characteristics, such as, for example, local maximum points of a waveform associated with the reference media signal (block 1204). The example delta calculator 208 calculates a plurality of time intervals or deltas between the media characteristics identified by the example media characterizer 206 at block 1204 (block 1206). In response to determining the plurality of deltas, the example delta calculator 208 additionally calculates a plurality of ratios based on the plurality of deltas (block 1208). As disclosed herein, the ratios may be between a first delta and a nearest neighbor, between a first delta and a second nearest neighbor, between even deltas, between odd deltas, etc. The example signature generator 210 aggregates the plurality of ratios determined for the reference media signal to generate a reference ratio signature for the reference media represented by the reference media signal (block 1210). Thereafter, the example instructions 1200 cease. Numerous reference ratio signatures may be generated for a plurality of media in this manner and may be stored in the reference signature database 211 for subsequent media identification. In some examples where the example program 1200 is generating reference ratio signatures for media, the example media signal may be quality controlled and the signature generation may be performed in a controlled environment to avoid variations in the signature generation.

FIG. 12B is an example flow diagram representative of example machine-readable instructions 1220 that may be executed to implement the example meter 202 of FIG. 2. At block 1222, the example media characterizer 212 obtains and analyzes a monitored media signal (e.g., a potentially time-compressed media signal) from an example output device. In the illustrated example, the example media characterizer 212 identifies media characteristics, such as, for example, local maximum points of a waveform associated with the monitored media signal (block 1224). The example delta calculator 214 calculates a plurality of deltas between the monitored media characteristics identified by the example media characterizer 212 in block 1224 (block 1226). In response to determining the plurality of deltas, the example delta calculator 214 additionally calculates a plurality of ratios based on the plurality deltas (block 1228). In some examples, the example signature generator 216 aggregates the plurality of ratios determined for the monitored media signal to generate a monitored media ratio signature for the media represented by the monitored media signal (block 1230). The example signature generator 216 sends the example monitored media ratio signature, media characteristics, and/or a monitored media delta signature corresponding to the plurality of deltas to the example media manager 204 via the network 217 (block 1232). Thereafter, the example instructions 1220 cease.

Figure 13:
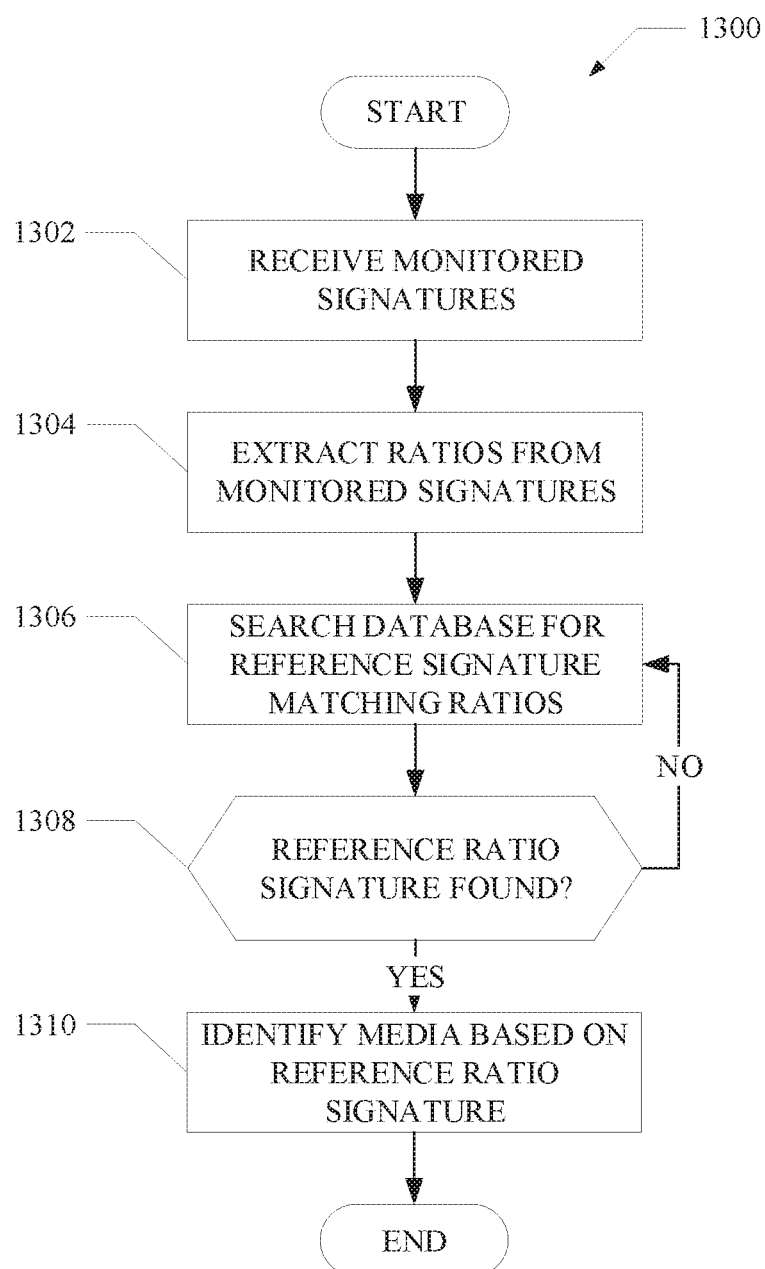
FIGS. 13-15 are example flow diagrams representative of example machine-readable instructions that may be executed to implement the example media manager of FIG. 2.

FIG. 13 is an example flow diagram representative of example machine-readable instructions 1300 that may be executed to implement the example media manager of FIG. 2 to match monitored signatures to reference ratio signatures.

At block 1302, the example signature receiver 218 receives a monitored media ratio signature from the example meter 202. In some examples, the example delta extractor 220 extracts the monitored ratios from the monitored media ratio signature (block 1304). The example signature comparator 222 searches the example reference signature database 211 for reference ratio signatures with ratios matching the monitored ratios for the monitored media signal (block 1306). In some examples the example signature comparator 222 searches for reference ratio signatures matching at least one of the monitored ratios, reference ratio signatures matching a majority of the monitored ratios, reference ratio signatures matching all of the monitored ratios, reference ratio signatures matching a threshold number of the monitored ratios, etc.

If the example signature comparator 222 does not identify a reference ratio signature matching (e.g., identical, substantially similar, having a threshold number of matching ratios, etc.) the monitored ratios (e.g., the ratio signature generated for the monitored media signal) (block 1308: NO), then control returns to block 1306. In some examples, the example signature comparator 222 searches for identical matches first, then if no matches are found, the example signature comparator 222 searches for substantially similar matches, then if no matches are found, the example signature comparator 222 searches for a threshold number of matching ratios.

If the example signature comparator 210 identifies a reference ratio signature matching (e.g., identical, substantially similar, having a threshold number of matching ratios, etc.) the monitored ratios (e.g., the ratio signature generated for the monitored media signal) (block 1308: YES), then the example media identifier 224 determines that the reference media associated with the matching reference ratio signature should be associated with the monitored media signal. The example media identifier 224 identifies the monitored media signal as being associated with the reference media associated with the matching reference ratio signature (block 1310). Thereafter, the example instructions 1300 cease.

Figure 14:
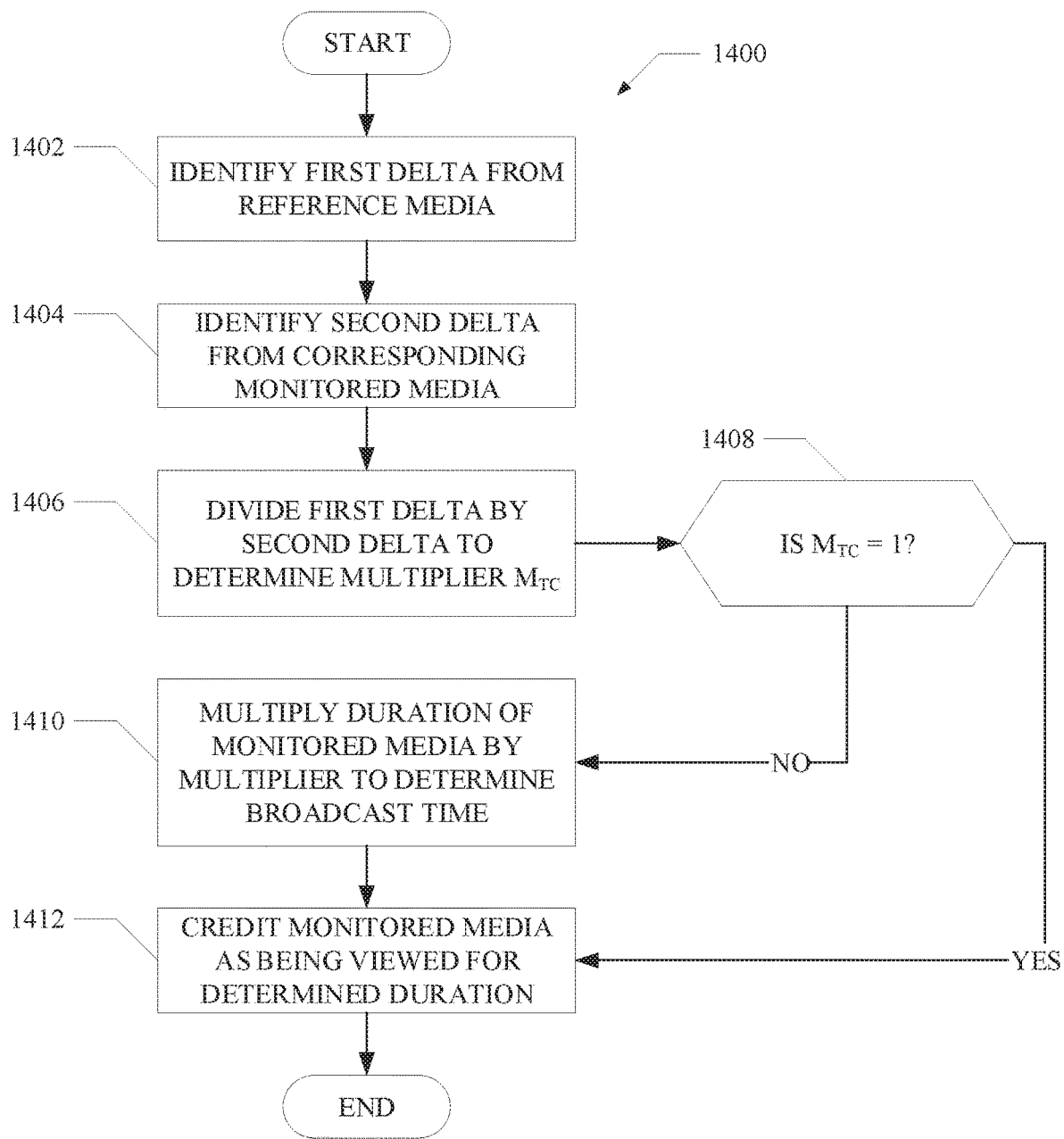

FIG. 14 is an example flow diagram representative of example machine-readable instructions 1400 that may be executed to implement the example media manager 204 of FIG. 2 to credit identified media. In some examples, the example instructions 1400 are executed subsequent to example instructions 1200, 1220, and 1300. In some examples, example instructions 1200, 1300, and 1400 may be executed concurrently in parallel.

As discussed herein, media may be presented at an increased playback rate. If media is presented in this manner, the length of time associated with media consumption will be shorter than if the media was presented at an original playback rate, even though the same media was consumed. To align media played at an increased rate with media played at the original playback rate, the example program 1400 determines the time-compression factor and/or the increased playback rate.

The example delta extractor 220 identifies a monitored media ratio signature and a matching reference ratio signature identified by the example signature comparator 222 via instructions 1300. The example delta extractor 220 identifies a first delta associated with the reference ratio signature (block 1402). In the illustrated example, the reference ratio signature is associated with a reference media signal, which has the original playback rate. The example delta extractor 220 identifies a second delta associated with the monitored media ratio signature (block 1404). In some examples, the first and second deltas correspond to the first deltas used to compute the first ratios that match in their respective signatures. For example, as previously disclosed in conjunction with FIGS. 9-10, the first delta may be dTr(1) and the second delta may be dTm(4). To determine the multiplier $M_{TC}$, the example multiplier identifier 226 divides the first delta by the second delta (e.g., dTr(1)/dTm(4)) (block 1406).

Additionally or alternatively, the example multiplier identifier 226 may determine the example multiplier by dividing an amount of media presented (e.g., the difference between timestamps of media) by the amount of time for which the media was presented. In some examples, media is presented at the original playback speed, presented at an increased playback speed, and then returned to the original playback speed (or vice a versa), which potentially can lead to gaps in crediting. In some examples, the example media creditor 228 may identify gaps in crediting and request media time stamps associated with the start and stop times of the gap in crediting from the media characterizer 212. The example media characterizer 212 determines the duration of the media that was presented during the gap in crediting by comparing the time stamp of the media when the gap started and when the gap ended. For example, a gap in crediting may develop at minute 15 of a media program and end at minute 45 of the media program. In such examples, the media characterizer 212 determines the duration of the media presented to be 30 minutes of media. However, the example media characterizer 212 may also determine, via the clock, that those 30 minutes of media were presented in 20 minutes of time. Therefore, the example multiplier identifier 226 can determine the example multiplier associated with the gap in crediting by dividing the amount of media presented (e.g., 30 minutes) by the amount of time for which the media was presented (e.g., 20 minutes), or $M_{TC}$=30 min/20 min=1.5. Determining the multiplier (and thus a change in playback rate) in this manner may be combined with current crediting techniques and/or the crediting techniques disclosed herein.

If the example $M_{TC}$ does not equal one (block 1408: NO), the example media creditor 228 determines the monitored media signal is time-compressed media and obtains the duration of the monitored media from the example media characterizer 212. The example media creditor 228 multiplies the duration of the monitored media by the multiplier $M_{TC}$ to determine the broadcast time for which to credit the monitored media (block 1410) and control proceeds to block 1412. However, if the example $M_{TC}$ equals one (block 1408: YES), the example media creditor 228 determines the monitored media signal is not time-compressed and control proceeds to block 1412.

At block 1412, the example media creditor 228 communicates with the example media identifier 224 to credit the media associated with the monitored media signal as having been presented for a determined duration. In some examples wherein the monitored media signal is time-compressed, the example media creditor 228 credits the media as being presented for the duration determined in block 1410. In some examples wherein the monitored media signal is not time-compressed (e.g., $M_{TC}$=1), the example media creditor 228 credits the media as being presented for the duration determined by the example media characterizer 212. Alternatively, the example media creditor 228 can determine the broadcast time for which to credit the example media by determining the amount of media presented through time-stamp analysis, as disclosed above. Thereafter, the example instructions 1400 cease.

FIG. 15 is an example flow diagram representative of example machine-readable instructions 1500 that may be executed to implement the example signature comparator 222 of FIG. 2 to match signatures having errors to reference ratio signatures in the example reference signature database 211. As described above, the example signature comparator 222 searches the example reference signature database 211 for reference ratio signatures matching the monitored ratios (e.g., the ratio signature for the monitored media signal). In some examples, the monitored media signal is missing energy peaks, which leads to monitored media deltas and ratios that do not match to the ratios in a reference ratio signature. While using a majority approach (e.g., does a majority of monitored ratios match the reference ratio signature) can counteract this possibility, the example instructions 1500 can reduce the number of non-matching ratios.

At block 1502, the example signature comparator 222 determines whether the plurality of ratios of the monitored media signal has an identical match to a reference ratio signature. If so (block 1502: YES), the example instructions 1500 cease. However, if the plurality of ratios of the monitored media signal do not match a reference ratio signature exactly (block 1502: NO), control proceeds to block 1504. At block 1504, the example delta extractor 220 identifies each ratio in the monitored media ratio signature and the reference ratio signature and the signature comparator 222 compares them one by one. If the next monitored media ratio matches the corresponding ratio in the reference ratio signature (block 1504: YES), control proceeds to block 1506. At block 1506, the example signature comparator 222 utilizes a first level reference ratio signature to match ratios in the monitored media ratio signature. In some examples, the first level reference ratio signature includes reference ratios defined as: $dTr(n)/(dTr(n)+dTr(n+1))$. This is compared to a monitored media ratio signature that includes monitored media ratios defined as $dTm(n)/(dTm(n)+dTm(n+1))$.

If there are more ratios (block 1508: YES), control returns to block 1504. If, at block 1504, the next monitored media ratio does not match the corresponding ratio in the reference ratio signature (block 1504: NO), control proceeds to block 1510. At block 1510, the example signature comparator 222 utilizes a second level reference ratio signature to match ratios in the monitored media ratio signature. In some examples, the second level reference ratio signature includes ratios defined as: $dTr(n)/(dTr(n)+dTr(n+1)+dTr(n+2))$. This is compared to the monitored media ratio signature that includes ratios defined as $dTm(n)/(dTm(n)+dTm(n+1))$. An example ratio from an example second level reference ratio signature at point $dRr(2)$ would be $dTr(2)/(dTr(2)+dTr(3)+dTr(4))$ while a corresponding example ratio from the monitored media ratio signature at point $dRm(2)$ would be $dTm(2)/(dTm(2)+dTm(3))$. In such an example, the monitored media delta $dTm(3)$ is equal to $dTr(3)+dTr(4)$.

The example second level reference ratio signature allows the example signature comparator 222 to identify a matching reference ratio signature when the monitored media ratio signature has an error (e.g., due to a missing energy peak in the monitored media signal). Additional levels of ratios may be used to correct for additional errors, without departing from the scope of the present disclosure. Additionally, different ratio techniques may be combined with the additional levels of ratio signatures. Control then proceed to block 1508, and if there are no more ratios (block 1508: NO), the example instructions 1500 cease.

In some examples, the example monitored meter signal has extra peaks, which may affect the example monitored media deltas and/or ratios. In such examples, the example signature comparator 222 may utilize a first level monitored media ratio signature to match ratios in the monitored media ratio signature to reference ratio signatures. In some examples, the first level monitored media ratio signature includes ratios defined as: $dTm(n)/(dTm(n)+dTm(n+1))$. This is compared to a reference ratio signature that includes ratios defined as $dTr(n)/(dTr(n)+dTr(n+1))$. Similarly as disclosed above, the example signature comparator 222 may utilize a second level monitored media ratio signature to match ratios in the monitored media ratio signature. In some examples, the second level monitored media ratio signature includes ratios defined as: $dTm(n)/(dTm(n)+dTm(n+1)+dTm(n+2))$. This is compared to the reference ratio signature that includes ratios defined as $dTr(n)/(dTr(n)+dTr(n+1))$. An example ratio from an example second level monitored media ratio signature at point $dRm(2)$ would be $dTm(2)/(dTm(2)+dTm(3)+dTm(4))$ while a corresponding example ratio from the reference ratio signature at $dRr(2)$ would be $dTr(2)/(dTr(2)+dTr(3))$. In such an example, the reference delta $dTr(3)$ is equal to $dTm(3)+dTm(4)$.

The example second level monitored media ratio signature allows the example signature comparator 222 to identify a matching reference ratio signature when the monitored media ratio signature has an error (e.g., due to an extra energy peak in the monitored media signal). Additional levels of ratios may be used to correct for additional errors, without departing from the scope of the present disclosure. Additionally, different ratio techniques may be combined with the additional levels of ratio signatures.

As disclosed above, missing and/or extra characteristics may appear in the example reference media signal and/or the example monitored media signal. While the above example machine-readable instructions 1500 are disclosed with respect to errors in the example monitored media signal (and thus the example monitored media delta and/or ratio signatures), these example instructions may be applied to the example reference media signal (and thus the corresponding example reference media delta and ratio signatures) when missing and/or extra characteristics appear in the example reference media signal.

Figure 16:
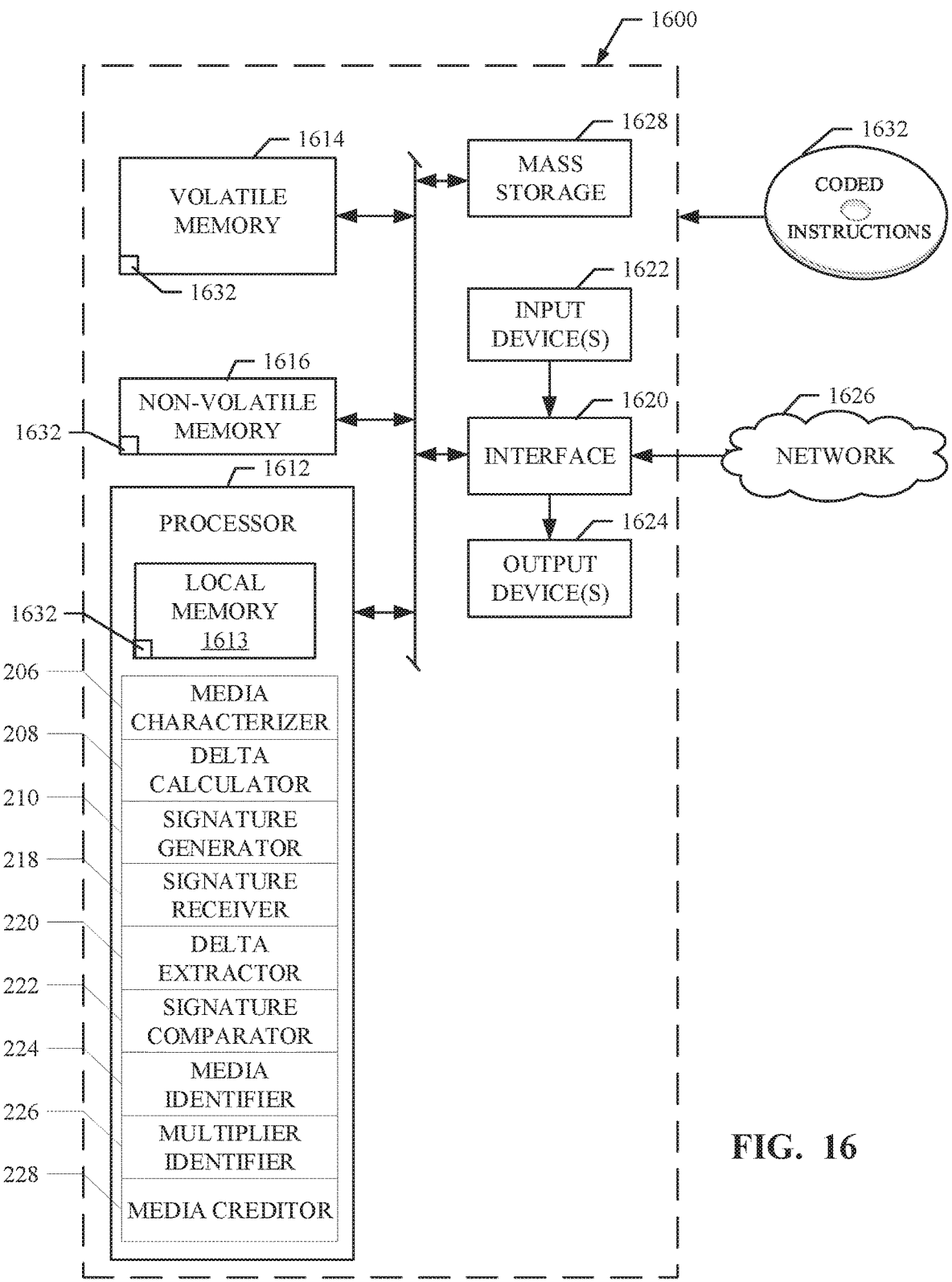
FIG. 16 illustrates an example processor platform structured to execute the example machine-readable instructions of FIGS. 12A-15 to implement the example reference signature generator, the example meter, and/or the example media manager of FIG. 2.

FIG. 16 is a block diagram of an example processor platform 1600 capable of executing the instructions of FIGS. 12A-15 to implement the example media manager 200 of FIG. 2. The processor platform 1600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). Additionally, the example processor 1612 may further include the example media characterizer 206, the example delta calculator 208, the example signature generator 210, the example signature receiver 218, the example delta extractor 220, the example signature comparator 222, the example media identifier 224, the example multiplier identifier 226, and the example media creditor 228.

The processor 1612 of the illustrated example is in communication with a main memory including a volatile memory 1614 and a non-volatile memory 1616 via a bus

1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 12A-15 may be stored in the mass storage device 1628, in the volatile memory 1614, in the non-volatile memory 1616, and/or on a removable tangible computer readable storage medium such as a CD or DVD.

From the foregoing, it will be appreciated that the above disclosed methods, apparatus, and articles of manufacture identify media by generating signatures that are unaffected by time-compression and/or playback rate multipliers. Additionally, the above disclosed methods, apparatus, and articles of manufacture credit identified media for the amount of time the media would be presented if there were no time-compression and/or playback rate multipliers involved. This allows time-compressed media and/or media with an increased playback rate to be credited in unison with media with a normal playback rate.

The disclosed methods, apparatus, and articles of manufacture solve a unique problem created by the use of time-compressed media and increasing the rate of media playback. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to identify media, the apparatus comprising:
   memory including computer readable instructions; and
   a processor to execute the instructions to at least:
      determine a first ratio based on a first time interval and a second time interval of a plurality of time intervals of a monitored media signature, the monitored media signature based on a monitored media signal, respective ones of the plurality of time intervals corresponding to respective adjacent characteristics in the media;
      determine a second ratio based on a third time interval and a fourth time interval of the plurality of time intervals of the monitored media signature;
      generate a monitored media ratio signature based on the first and second ratios; and
      compare the monitored media ratio signature with a reference ratio signature to identify the media.

2. The apparatus as defined in claim 1, wherein the first time interval and the second time interval are adjacent, and the third time interval and the fourth time interval are adjacent.

3. The apparatus as defined in claim 2, wherein the processor is to identify, in a reference ratio signature database, a reference ratio signature including a third ratio and a fourth ratio, the third ratio of the reference ratio signature to match the first ratio of the monitored media ratio signature and the fourth ratio of the reference ratio signature to match the second ratio of the monitored media ratio signature.

4. The apparatus as defined in claim 3, wherein the processor is further to:
   identify a fifth time interval corresponding to the third ratio; and
   divide the fifth time interval by the first time interval to determine a time-compression factor.

5. The apparatus as defined in claim 4, wherein the processor is to
   determine a duration of the media associated with the monitored media signature;
   multiply the duration of the media by the time-compression factor to obtain a crediting duration; and
   credit the media as having been presented for the crediting duration.

6. The apparatus as defined in claim 2, wherein the processor is to:
   divide the first time interval by a sum of the first time interval and the second time interval to determine the first ratio; and
   identify, in a reference ratio signature database, a reference ratio signature including a third ratio that matches the first ratio of the monitored media ratio signature, the third ratio based on a fifth time interval of a reference media signature divided by a sum of the fifth time interval, a sixth time interval of the reference media signature, and a seventh time interval of the reference media signature.

7. The apparatus as defined in claim 2, wherein the processor is to:
   divide the first time interval by a sum of the first time interval, the second time interval, and the third time interval of the monitored media signature to determine a third ratio; and identify, in a reference ratio signature database, a reference ratio signature including a fourth ratio that matches the third ratio of the monitored media ratio signature, the fourth ratio based on a fifth time interval of a reference media signature divided by a sum of the fifth time interval and a sixth time interval of the reference media signature.

8. A tangible computer readable storage medium comprising instructions that, when executed, cause a machine to at least:
determine a first ratio based on a first time interval and a second time interval of a plurality of time intervals of a monitored media signature, the monitored media signature based on a monitored media signal, respective ones of the plurality of time intervals corresponding to respective adjacent characteristics in the media;
determine a second ratio based on a third time interval and a fourth time interval of the plurality of time intervals of the monitored media signature; and
compare a monitored media ratio signature generated based on the first and second ratios with a reference ratio signature identify the media.

9. The storage medium as defined in claim 8, wherein the first time interval and the second time interval are adjacent, and the third time interval and the fourth time interval are adjacent.

10. The storage medium as defined in claim 9, wherein the instructions, when executed, further cause the machine to identify, in a reference database, a reference ratio signature including a third ratio and a fourth ratio, the third ratio of the reference ratio signature to match the first ratio of the monitored media ratio signature and the fourth ratio of the reference ratio signature to match the second ratio of the monitored media ratio signature.

11. The storage medium as defined in claim 10, wherein the instructions, when executed, further cause the machine to:
identify a fifth time interval corresponding to the third ratio; and
divide the fifth time interval by the first time interval to determine a time-compression factor.

12. The storage medium as defined in claim 11, wherein the instructions, when executed, further cause the machine to:
determine a duration of the media associated with the monitored media signature;
multiply the duration of the media by the time-compression factor to obtain a crediting duration; and
credit the media as having been presented for the crediting duration.

13. The storage medium as defined in claim 9, wherein the instructions, when executed, further cause the machine to:
divide the first time interval by a sum of the first time interval, the second time interval, and the third time interval of the monitored media signature to determine a third ratio; and
identify, in a reference database, a reference ratio signature including a fourth ratio matching the third ratio of the monitored media ratio signature, the fourth ratio based on a fifth time interval of a reference media signature divided by a sum of the fifth time interval and a sixth time interval of the reference media signature.

14. An apparatus to identify media, the apparatus comprising:
means for accessing a monitored media signature from a meter that is to monitor an output device, the monitored media signature based on a media signal associated with a presentation of the media by the output device;
means for generating a monitored media ratio signature from the monitored media signature, the means for generating to:
determine a first ratio based on a first combination of time intervals of the monitored media signature, the monitored media signature including a plurality of time intervals, respective ones of the time intervals corresponding to respective adjacent characteristics in the media;
determine a second ratio based on a second combination of time intervals of the monitored media signature; and
generate the monitored media ratio signature based on the first and second ratios; and
means for comparing the monitored media ratio signature with a reference ratio signature in a reference ratio signature database to identify the media.

15. The apparatus as defined in claim 14, wherein the first combination of time intervals includes a first time interval and a second time interval, and the second combination of time intervals includes a third time interval and a fourth time interval.

16. The apparatus as defined in claim 15, wherein the means for comparing is to:
identify, in the reference ratio signature database, a reference ratio signature including a third ratio and a fourth ratio, the third ratio of the reference ratio signature matching the first ratio of the monitored media ratio signature and the fourth ratio of the reference ratio signature matching the second ratio of the monitored media ratio signature; and
identify the media as a reference media associated with the reference ratio signature.

17. The apparatus as defined in claim 16, further including a means for determining a time-compression factor by:
identifying a fifth time interval corresponding to the third ratio; and
dividing the fifth time interval by the first time interval to determine the time-compression factor.

18. The apparatus as defined in claim 17, wherein the means for determining the time-compression factor is to determine a duration of the media associated with the monitored media signature, and further including crediting means for crediting the media by:
multiplying the duration of the media by the time-compression factor to obtain a crediting duration; and
crediting the media as having been presented for the crediting duration.

19. The apparatus as defined in claim 15, wherein the means for generating the monitored media ratio signature is to divide the first time interval by a sum of the first time interval and the second time interval to determine the first ratio, and the means for comparing is to identify, in the reference ratio signature database, a reference ratio signature including a third ratio matching the first ratio of the monitored media ratio signature, the third ratio based on a fifth time interval of a reference media signature divided by a sum of the fifth time interval, a sixth time interval of the reference media signature, and a seventh time interval of the reference media signature.

20. The apparatus as defined in claim 15, wherein the means for generating the monitored media ratio signature is to divide the first time interval by a sum of the first time interval, the second time interval, and the third time interval of the monitored media signature to determine a third ratio, and the means for comparing is to identify, in the reference ratio signature database, a reference ratio signature including a fourth ratio matching the third ratio of the monitored media ratio signature, the fourth ratio based on a fifth time interval of a reference media signature divided by a sum of the fifth time interval and a sixth time interval of the reference media signature.

\* \* \* \* \*